United States Patent [19]

Titchener

[11] Patent Number: 4,670,890
[45] Date of Patent: Jun. 2, 1987

[54] METHOD OF AND/OR APPARATUS FOR ENCODING AND DECODING SEQUENTIAL INFORMATION IN DATA HANDLING SYSTEMS

[75] Inventor: Mark Titchener, Auckland, New Zealand

[73] Assignee: Research Corporation, New York, N.Y.

[21] Appl. No.: 585,330

[22] Filed: Mar. 1, 1984

[30] Foreign Application Priority Data

Mar. 4, 1983 [NZ] New Zealand .................... 203481

[51] Int. Cl.⁴ ............................................. H04L 7/02
[52] U.S. Cl. .................................... 375/110; 375/114; 371/47
[58] Field of Search ...................... 375/110, 114, 116; 371/42, 46, 47

[56] References Cited

U.S. PATENT DOCUMENTS 3,716,851  2/1973  Neumann ............................ 375/110

Primary Examiner—Robert L. Griffin
Assistant Examiner—M. Huseman
Attorney, Agent, or Firm—Scully, Scott, Murphy & Presser

[57] ABSTRACT

The specification discloses a method and apparatus for encoding and decoding a variable length augmented code for use in the transmission of sequential information as an indefinite length string of data. Both binary and alternate character code sets are discussed for transmitting and translating information. The variable length code symbols are self synchronizing, and will automatically reestablish synchronization within two characters if a bit or number of bits is lost through noise or faulty transmission. The resynchronization is automatic and occurs by virtue of the construction of the variable length augmented codes. In addition, a method and means of creating a fixed length depleted code for use in digital processors and digital storage media is also disclosed. Inasmuch as most digital processors utilize fixed length words, it is desirable to be able to convert the variable length augmented code into a fixed length depleted code, and to be able to reconvert from the depleted code back to the augmented code without necessity of resorting to an extensive lookup table for each of the characters. In creating the augmented set of self synchronizing variable length code symbols, the original character set $C^0$ is augmented 9 times until the $C^q = 2^{q(n-1)} + 1$ wherein n represents the number of distinct elements in the original character set $C^0$ that was augmented, and $|C^q|$ is equal to the number of symbols derived in the final augmented set $C^q$, and is equal to or greater than the desired number of characters to be used in the data handling and communication.

15 Claims, 18 Drawing Figures

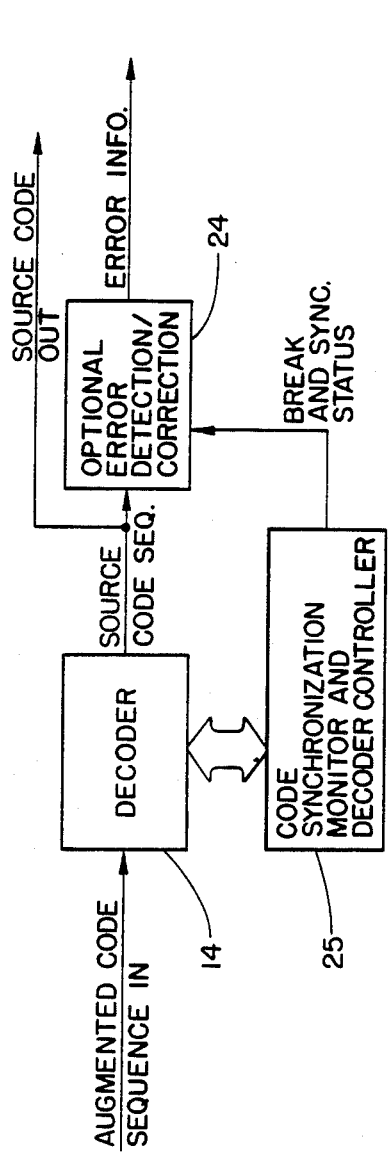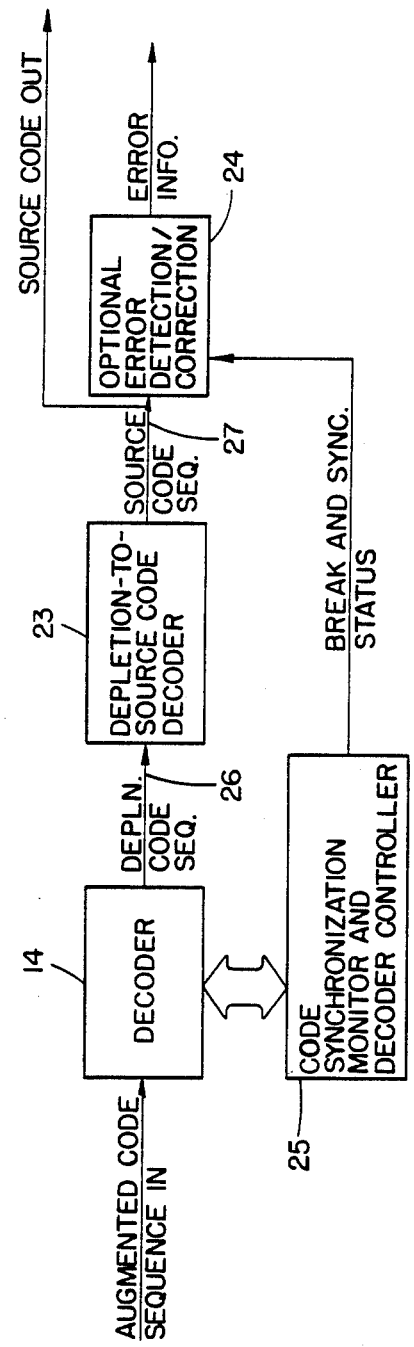

METHOD OF AND/OR APPARATUS FOR ENCODING AND DECODING SEQUENTIAL INFORMATION IN DATA HANDLING SYSTEMS

FIELD OF THE INVENTION

The present invention relates to a method of and/or apparatus for encoding and decoding sequential information in data handling systems and relates particularly to the use of codes having the property of enabling character synchronization to be established substantially automatically upon applying simple decoding procedures.

In the preferred form the present invention relates to applications of these codes to the encoding and serial transmission or storage of digitally represented data.

BACKGROUND OF THE INVENTION

Much literature has already been assembled on the subject of comma-free codes and synchronizable codes. In the context of the following the term "word" will refer to any sequential ordering of characters which have been defined such that this ordering has significance in representing information content. It is possible that a word so defined will in the process of an encoding scheme be associated with characters taken from some further system of representation or character set. Thus the terms "character" and "word" or "code" and "code word", depending on the context, may be interchangeable without introducing any ambiguity.

A finite code is called synchronizable if and only if there exists a least integer m such that the knowledge of the last m characters of a message suffices to determine separation of code words.

The concept of comma-free codes was first introduced by Golomb et al ("Comma-free codes Can. J. of Math, Vol. 10 pp 202–209, 1958) although Scholtz later suggested ("Mechanization of codes with bounded synchronization delays", IEEE T-IT Vol. IT-16, pp 438–446 July 1970) that the term "comma-free" may be interpreted to include any codes which can be used without resorting to the use of commas (i.e. a special symbol or signal to mark character separation). It is this definition I have chosen to use, for while the codes introduced here do not comply with the definition provided by Golomb in 1958, they may in fact be used without resorting to the use of commas in accordance to Scholtz's interpretation.

The term bounded synchronization delay (BSD) code describes any code for which any segment of a sequence of code words can be synchronized after observing at most s code symbols for some finite value of s.

SUMMARY OF THE INVENTION

Accordingly, it is an object of the present invention to provide a method of and/or apparatus for encoding and decoding sequential information in data handling systems which will at least provide the public with a useful choice.

Accordingly in one aspect the invention may broadly be said to consist in apparatus in the encoding and decoding of sequential information in data handling systems including, data transfer, data storage and/or data processing systems, said apparatus comprising either one or a combination of more than one of the following integers (A) through (E), or a combination of integers (A) through (E) with integer (F), or a combination of integers (C) and (H) with any, all or none of (A), (B), (D), (E), (F), (G) said integers comprising:

(A) means of forming a set of variable length codes herein referred to as augmented codes, said augmented codes having the specific property of enabling character synchronization to occur substantially automatically on normal decoding procedures;

(B) means of forming a set of fixed length binary codes corresponding to a set of augmented codes, and herein referred to as depletion codes, said depletion codes being used, for example, in the manipulation and processing of sequential data representing augmented code data sequences;

(C) means for reconstituting augmented codes from the corresponding depletion codes;

(D) means for transposing augmented codes into corresponding depletion codes;

(E) an encoding subsystem comprising an inputting means for accepting a sequential data string, a means for encoding said input data string into a corresponding augmented code sequence, and a means to output sequentially said augmented code form of the data string;

(F) a decoding subsystem comprising an inputting means for accepting sequentially an augmented code string, a means for decoding said input augmented code string to an output data string, and a means for outputting said data string;

(G) means to communicate or store or process, or any combination of these thereof, said input and output data strings whether said means to communicate store or process be electronic, optical, or otherwise, whether said means to communicate, store or process be serial or parallel in nature of a combination thereof, and whether said means to communicate, store or process be essentially linear or cyclical or a combination thereof;

(H) means for determining in either or both said augmented code sequence or in corresponding depletion code sequence and thus in the decoded data sequence, the code at which synchronization has occurred with certainty, following a break or interruption or other arbitrary point in said augmented code or depletion code sequence;

Preferably the augmentation means to form said augmented codes in accordance with (A) comprises a means to form a first set of unique character symbols, a means to repeat said first set of characters, a means to delete a selected character and to augment said repeated first set of characters by prefixing said repeated first set of characters with said deleted character to form an unambiguous code set, and a means to assign values to elements of said code set.

Preferably said augmentation means further include means to repeat said steps a selected number of times, said first set of unambiguous characters of one cycle of steps, other than in the first cycle, comprising the unambiguous code set of the preceding cycle of steps.

Said augmented character set resulting from repeated application of a single cycle of said augmentation process will hereinafter be referred to as an augmented set of degree q, where q is an integer equal to the number of times said augmentation process is repeated for said augmented character set.

Preferably said means of forming a corresponding set of fixed length binary codes or depletion codes includes means for performing the steps of forming the complete list of $2^{k+m}$ fixed length binary numerical codes of length $(k+n)$ bits, where k is the number of times said augmentation step has been repeated for the augmented codes corresponding to the desired depletion codes, m is the smallest integer satisfying the relationship $$2^m \geq s$$

where s is the integer number of characters in said first set, means to delete all binary codes for which the n least significant bits corresponding numerically to an integer w satisfy some criterion, means to group remaining fixed length codes, means to delete binary codes from alternate groups, further means to regroup the remaining codes and to further delete selected characters from alternate groups, and means to repeat these steps until a desired set of block codes is reached.

Preferably said means to first delete said binary codes in which the n least significant bits correspond to an integer w deletes only said binary codes for which said w satisfies the criterion that $$w \geq s$$

and said means leaves no other codes in said remaining codes which satisfy this criterion.

Preferably said means to group said remaining binary codes forms groups comprising exactly s codes each, and preferably said means to regroup said binary codes subsequent to said deletions in alternate groups forms said binary codes in groups double in size of previous grouping or regrouping cycle and includes in the code count for each group an allotted space corresponding to said deletions made previously in alternate groups.

Preferably said means to delete said binary codes in alternate groups includes a deletion in the first group in each cycle, said cycle involving the steps of both grouping or regrouping and deleting, and deletions in the subsequent alternate groups corresponding in relative position within the respective groups to the said deletion in said first group.

Preferably said means to delete said binary codes is limited to deleting just one code in each alternate group during each cycle, said cycle comprising the steps of grouping or regrouping and deleting.

Preferably said means to repeat said cycle of grouping or regrouping and deleting is limited to a total of q cycles.

Preferably said encoding means repeats said augmenting step a selected number of times, said first set of unambiguous characters of one cycle of steps, other than the first cycle comprising the unambiguous code set of the preceding cycle of steps.

Preferably said means to determine point of synchronization comprises means to decode said augmented data sequence, using said augmented codes of degree n, starting said synchronization process with n=0 or 1, means to check for receipt of codes satisfying a predetermined criterion, and then means proceed to decode using the augmented codes of degree n+1 if the predetermined criterion is met, means to repeat said decoding and checking process until the degree of said augmented code set involved in the decoding has reached a predetermined value q, at which point synchronization is deemed to have occurred.

Preferably said means used for checking codes in said sequence includes means for checking if received code, as decoded using said augmentation set of a degree n for $n \leq q$, is other than the (n+1) prefix character as used in the next subsequent augmentation cycle i.e. the (n+1)th augmentation generating said augmented set of degree (n+1), if said checked code is in fact not said (n+1)th prefix then means to decode commences to use said augmented set of degree (n+1), if said checked code is identical to said (n+1)th prefix then said means to decode continues to use said augmented set of degree n.

Preferably said value q at which synchronization is deemed to have occurred is the same as the degree of augmented code set used to encode a data sequence to form said augmented code sequence.

In a further aspect, the invention may broadly be said to consist in a method of encoding and decoding of sequential information in data handling systems, said method comprising any one or more of the following steps (a) through (e), or combinations of any one or more of steps (a) through (e) with steps (f), or combinations or step (c) and step (g) with any one or more steps (a), (b), (d), (e), (f) or with none of the steps (a), (b), (c), (d), (e), (f), said steps comprising:

(a) forming a set of variable length codes herein referred to as augmented codes, said codes having the specific property of enabling character synchronization to occur substantially automatically on normal decoding procedures;

(b) forming a set of fixed length binary codes corresponding to a set of augmented codes, and herein referred to as depletion codes, said depletion codes being used for example in the manipulation and processing of sequential data representing augmented code data sequences;

(c) reconstituting augmented codes from the corresponding depletion codes;

(d) transposing augmented codes into corresponding binary depletion codes;

(e) encoding a data string into a corresponding augmented code sequence;

(f) decoding an augmented code string into a corresponding data sequence;

(g) determining in said augmented code sequence or in a corresponding depletion code sequence and therefore in the corresponding decoded data sequence, the code following in which synchronization has occurred with certainty, following a break or interruption or other arbitrary point in said augmented code or depletion code sequence;

Preferably the method of forming said augmented codes in accordance with (a) includes the steps of forming a code set by forming a first set of unique character symbols, repeating said first set of characters, deleting a selected character and augmenting said repeated first set of characters by prefixing said repeated first set of characters with said deleted character to form an unambiguous code set and assigning values to elements of said code set.

Preferably the said method further includes the steps of repeating said steps a selected number of times, said first set of unambiguous characters of one cycle of steps, other than the first cycle, comprising the unambiguous code set of the preceding cycle of steps, said augmented character set resulting from repeated application of a single cycle of said augmentation process is as before referred to as an augmented set of degree q, where n is an integer equal to the number of times said augmentation process is repeated for said augmented character set.

Preferably any one of said methods which includes determining the point of synchronization in accordance with step (g) includes the steps of decoding said inputted augmented data sequence, using said augmented codes of degree n in accordance with the preceding paragraph, starting said process for determining synchronization with either n=0 or 1, checking for receipt of character codes satisfying a predetermined criterion, and then proceeding to decode using the augmented codes of degree n+1 if said predetermined criterion is satisfied, repeating said decoding and checking process until the degree of said augmented code set involved in the decoding has reached a further predetermined value q, at which point synchronization is deemed to have occurred.

Preferably said criterion used in accordance with the preceding paragraph comprises a means for checking if received code as decoded using augmented set of a degree n, for some integer n, is other than the (n+1)th prefix character used in the next subsequent augmentation cycle, i.e. the (n+1)th augmentation, and proceeding to next subsequent augmentation set of degree (n+1) if said code is in fact not a prefix. If said code is received identical to said (n+1)th prefix then the decoding continues using said augmented set of degree n.

Preferably said value q at which synchronization is deemed to have occurred in accordance with the preceding paragraph is the same as the degree of the augmented code set used in accordance with step (e) to encode a data sequence.

Preferably said method further includes the steps of forming a corresponding set of fixed length binary codes or depletion codes comprises the steps of forming the complete list of $2^{k+n}$ fixed length binary numerical codes of length (k+n) bits, where k is the number of times said augmentation step has been repeated for the augmented codes corresponding to the desired depletion codes, n is the smallest integer satisfying the relationship $$2^n \geq s$$

where s is the integer number of characters in said first set, deleting all binary codes for which the n least significant bits corresponding numerically to an integer w satisfy some criterion, grouping of remaining fixed length codes, deleting binary codes from alternate groups, regrouping the remaining codes and deleting selected characters again from alternate groups, and repeating these steps until a desired set of block codes is reached.

Preferably said binary codes first deleted in accordance therewith before said grouping is performed, and in which the n least significant bits correspond to an integer wall satisfy the criterion that $$w \geq s$$

and further, no other codes remaining in the list satisfy this criterion.

Preferably the number of codes in a group for each cycle of steps, involving both grouping and deleting, starts with s codes for each group and is doubled each repeated cycle.

Preferably a deletion is made in the first group in each cycle involving the steps of both grouping and deleting, and deletions in the subsequent alternate groups correspond in their relative position, within the respective groups, to the code deleted in the first group.

Preferably only one character is deleted from any group during each cycle involving the steps of regrouping and deleting.

Preferably the steps of regrouping and deleting are carried out q times.

Preferably any one of said methods which includes forming said augmented codes as set forth in step (a) includes repeating said augmenting step a selected number of times, said first set of unambiguous characters of one cycle of steps, other than the first cycle comprising the unambiguous code set of the preceding cycle of steps.

The invention may broadly be said to consist in the parts, elements and features referred to or indicated in the specification of this application, individually or collectively and any and all combinations of any two or more of said parts, elements or features, and where specific integers are mentioned herein which have known equivalents are deemed to be incorporated herein as if individually set forth.

The invention consists in the foregoing, and also envisages constructions of which the following gives examples only.

BRIEF DESCRIPTION OF THE DRAWINGS

FIG. 5a is a block diagram showing an augmented-code to source-code decoder with code synchronization monitor, decoder controller, and optional error detection/correction block.

FIG. 5b is a block diagram as for FIG. 5a with decoder shown in two parts as for FIG. 4b.

DETAILED DESCRIPTION OF THE PREFERRED INVENTION

I. An Augmentation Algorithm

Consider a character set, $C^m \{D^m_i\}$, comprising the n distinct character elements, $D^m_i$;

$$\alpha, \beta, \gamma, \ldots, \nu$$

A second character set $C^{m+1} \{D^{m+1}_i\}$, comprising the $(2n-1)$ character elements, $D^{m+1}_i$;

$$\beta_1, \gamma_1, \ldots, \nu_1, \alpha_2, \beta_2, \gamma_2, \ldots, \nu_2$$

is defined to be the augmented character set of $C^m$ if it satisfies the following construction.

$$\beta_1 \equiv \beta$$
$$\gamma_1 \equiv \gamma$$
$$\vdots$$
$$\nu_1 \equiv \nu$$
$$\alpha_2 \equiv \alpha\alpha$$
$$\beta_2 \equiv \alpha\beta$$
$$\gamma_2 \equiv \alpha\gamma$$
$$\vdots$$
$$\nu_2 \equiv \alpha\nu$$

A procedure to produce an augmented set can begin by writing a word list consisting of the original character set $C^m$, twice over.

Next, one of the initial characters $D^m_i$, (any one) in the first part of the list is deleted and the deleted character is prefixed to each of the characters in the second half of the list. Note that such a construction specifically includes the combination formed by appending the prefix to itself.

Each word in the list is then assigned uniquely to one of the character symbols $D^{m+1}_i$ of the set $C^{m+1}$. Clearly the characters resulting from a single application of the augmentation rule can be of no more than one or two of the characters $D^m_i$ from the set $C^m$.

Figure 6A:
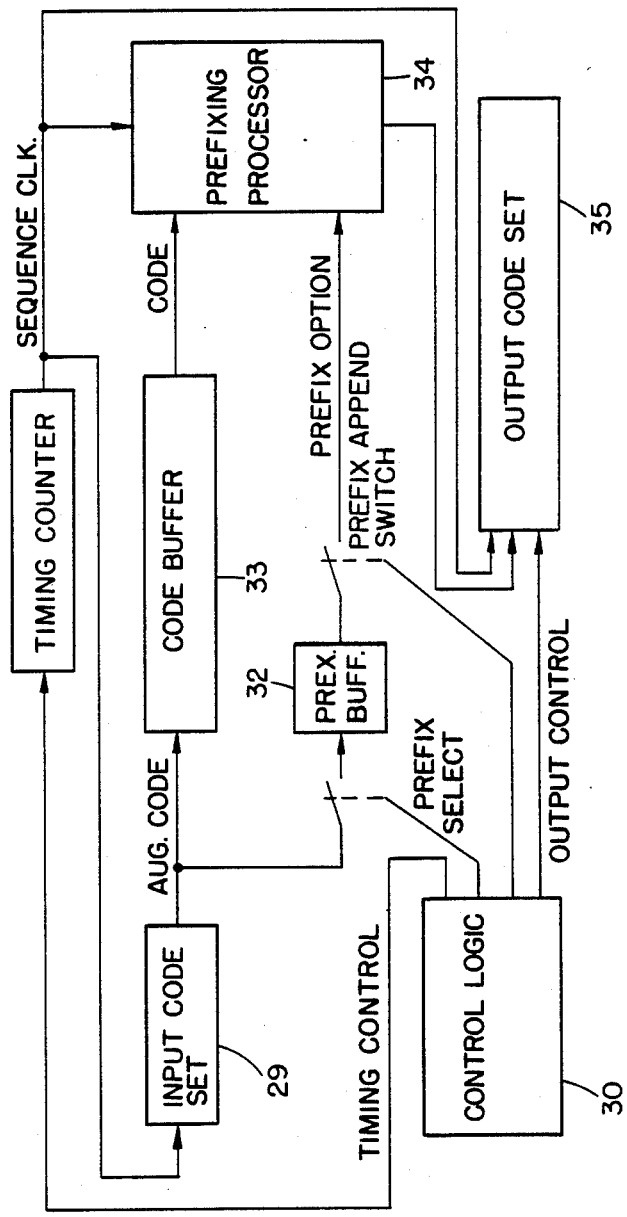
FIG. 6a is a block diagram of process for performing single level of set augmentation according to the present invention.

An example of apparatus for performing the above augmentation algorithm is depicted in block diagram form in FIG. 6a.

An algebraic notation representing the construction of a code set from a initial set $C^m$ can be introduced in accordance with the above augmentation algorithm. For a given initial code set $C^m$, and a prefix character $D^m_{prefix}$ we will write;

$$C^{m+1} = T(C^m, D^m_{prefix}) \quad (1)$$

where T( ) is the augmentation operator.

If the set $C^m$ is well ordered and the prefixing character is assumed to be the first character in the series then the notation may be abbreviated without ambiguity to simply;

$$C^{m+1} = T(C^m)$$

A character set C herein will be called complete if it contains all symbols necessary to represent a desired class of character strings, S {C}. The alphabet for example, is not a complete set since further punctuation and delimiting characters are required to support correct syntax in the English language, whereas the ASCII codes used in conjunction with computer terminal communications systems do form a complete character set.

A character sequence S {C}, defined on the character set C, will herein be called positively unbounded if for every character in S {C} there exists a subsequent character. (see section XXII)

II. Augmentation of qTh Degree

Repeated application of the algorithm, q times, on a set $C^m$ will be called the augmented set of the qth Degree and is represented thus;

$$C^{m+q} = T^q(C^m) \quad (2)$$

In which case a decoded sequence S $\{C^{m+q}\}$ corresponding to the character sequence S $\{C^m\}$ will be written algebraically as;

$$S\{C^{m+q}\} = [S \{C^m\}]^q \quad (3)$$

An initial character set $C^m = C^0$ used in such a repeated application of the augmentation process will herein be referred to as the base character set.

As a number of choices exists for any augmentation process the above notation will be seen to be ambiguous in this respect. However, in section XII hereinafter further notation is introduced for set designation thereby providing a means with which to resolve any such ambiguity which may otherwise exist.

An example showing the repeated application of the augmentation algorithm is given, in Table 1 (hereinafter) where the binary set $C^0 = \{0,1\}$, i.e. containing the characters '0' and '1', is used.

Figure 6B:
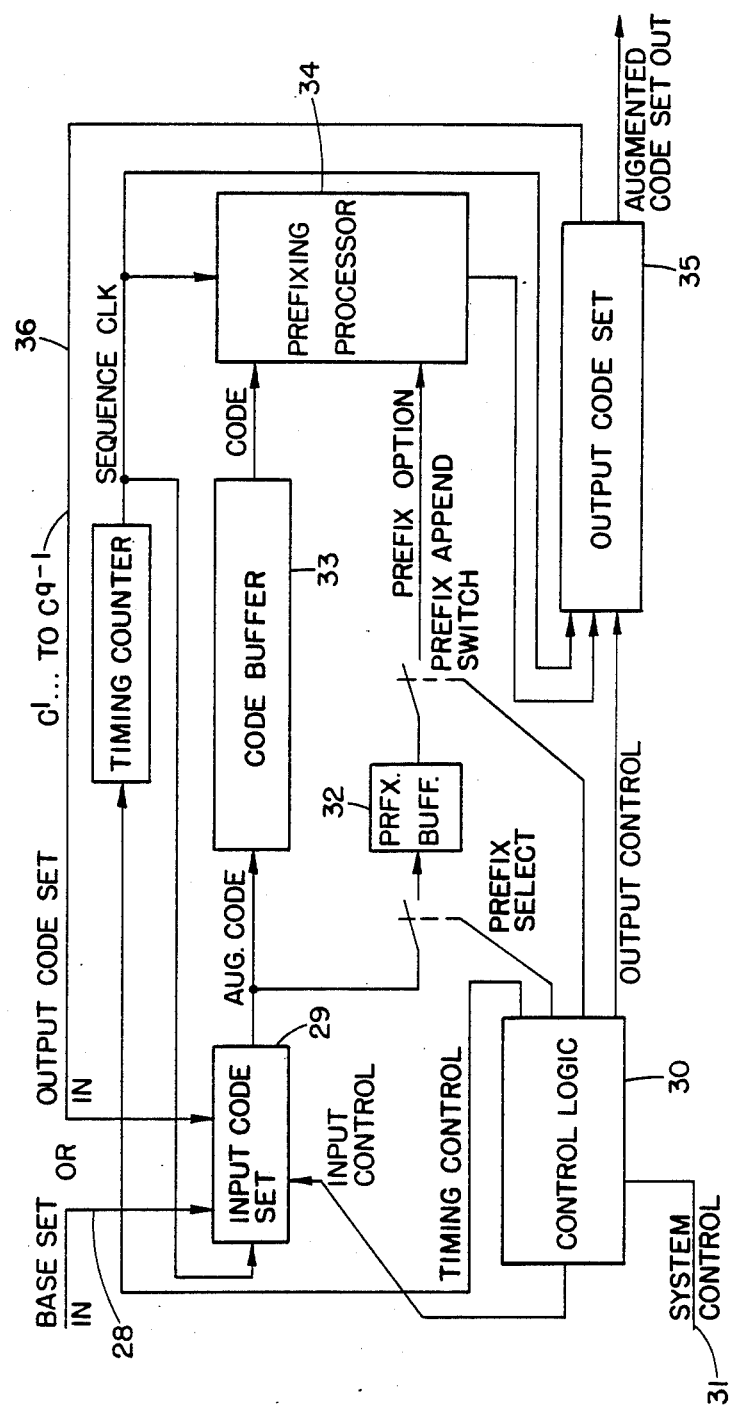
FIG. 6b is a block diagram of a process for performing multiple level set augmentation according to the present invention.

An example of apparatus for performing multiple augmentation is depicted in block diagram form in FIG. 6b.

III. Automatic Synchronization

A significant property possessed by the augmented codes of the invention, is their ability to recover character synchronization automatically during the decoding process following any perturbation or break during serial comma-free transmission of an encoded sequence. This property is stated for the general case in theorem 3 (hereinafter). An example of the synchronization process is illustrated in table 2 (hereinafter).

IV. Synchronization Delays And Error-Echo

If synchronization has been lost at some point during transmission and this noted by some means, then as the proof of theorem 3 (hereinafter) suggests, a technique exists for determining which decoded character represents the start of the correctly decoded sequence following that break.

Starting in the base set $C^0$, one waits until receipt of the first non-prefixing character. This marks the end of a valid common character boundary shared with the corresponding sequence of the next augmented character set, $C^1$. The process is repeated, each time moving to the next augmented set after the receipt of the non-prefixing character. This process is achieved in its most efficient form by proceeding to the highest available set $C^n$ as explained in detail in section XIX hereinafter.

Finally one arrives at the desired decoding character set $C^q$ characters decoded from here on are guaranteed to be correct provided no further errors have occurred since the break.

This is not to say that if one were to have continued the decoding immediately following the break using only the set $C^q$, one doesn't receive correctly decoded characters before the point of character-correct synchronization, but only that, if one does, correctness is not certain. For example, in the case of error echo, correct characters are produced by the decode operation in spite of the fact that synchronization has not been established. The startup procedure outlined avoids the problem of error-echo but at the expense of losing characters which may, and will in all likelihood, be valid.

The decription of the process above for determining the point of character correct synchronization is an example of the kind of process performed by the apparatus pictured in block form in FIGS. 5a and 5b as the synchronization monitor and source code decoder.

V. Set Size

It is convenient to introduce a notation for the size of a set. If a set $C\{D^m_i\}$ has n elements, $D^m_i$, then we will write;

$$|C^m\{D^m_i\}| = n$$

If $C^q$ is a set of the qth degree i.e. $C^q = T^q(C^0)$ and such that $|C^0| = n$ then $|C^q|$ may be deduced as follows. From the definition of the augmentation $|C^q| = 2|C^{q-1}| - 1$. thus;

$$|C^q| = 2(\ldots 2(2(2|C^0| - 1) - 1) - 1 \ldots) - 1 \quad (4)$$

$$= 2^q n - 2^{q-1} - 2^{q-2} - \ldots - 2^1 - 2^0$$

$$= 2^q n - (2^q - 1)$$

Finally $$|C^q| = 2^q(n - 1) + 1$$

$$|C^\circ| = n$$

where $n = |C^0|$ and q is the degree of set augmentation

VI. The Augmented Binary Codes

Augmented binary code sets are of particular interest in this basically binary world of digital computers and communications systems using a binary number base. Here the base character set contains only the two elements 0, 1; $C^0 = 0,1$. We now form an augmented set of the first degree according to the procedure outlined in section I. Table 1 shows this and also the further repeated application of the augmentation process producing an augmented binary character encoding scheme of the 4th degree, which is subsequently used to illustrate a number of the properties of the augmented codes.

TABLE 1

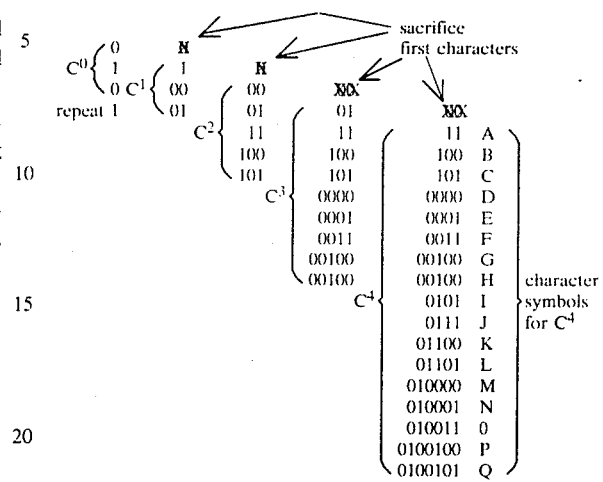

Table 1 shows an example of the construction of augmented binary codes of degrees m = 1,2,3,4.

VII. Automatic Recovery Using The Augmented Binary Codes

Consider the character sequence L,H,C,M,B,D,I, ... etc. using Table 1 we may simulate a fault in the transmission system as follows.

TABLE 2

| Simulated Error And Data Recovery | |
|---|---|
| message sequence encoded | L  H  C  M  B  D  I  ... <br> 01101/00101/101/010000/100/0000/0101/ ... etc |
| transmitted (error | 01101001011010100001000000101 ... <br> ↑, bit lost) |
| received | 0110001011010100001000000101 ... |
| message decoded recovered string | 01100/0101/101/010000/100/0000/0101/ ... <br> K   1 \| C   M   B   D   I   ... <br> corrected characters   > |

Table 2 illustrates the capabilities of the augmented binary codes of degree m = 4 from table 1, to recover character synchronization following a simulated error.

In table 2 the received string is shown to omit the fifth data bit corresponding to a simulated error. Upon decoding the recovered character string is shown to have resynchronized in this case after only two incorrect characters. Other simulated errors may be tried such as scrambling, bit loss etc., and in each case the comma-free codes displayed will resynchronize. A number of useful results may be derived for this family of augmented binary codes.

VIII. Augmented Code Families

Starting with any initial base character set in the construction of the augmented codes herein, there is a number of distinct sets at any level of augmentation which all have the properties of automatic character synchronization. This is illustrated using for example the base character set, $C^0 = \{0,1\}$.

In constructing the augmented set $C^1$, either the '1' or the '0' may be used as the initial prefixing character. Potentially, two sets each of three characters and each of the first degree exist, and may be designated $C^1$.

$C^1 = \{1,00,01\}$ or $C^1 = \{0,11,10\}$ (Here the first is simply the reciprocal representation of the second and, stemming directly from this symmetry in the initial augmentation, it will be apparent that at any higher level of augmentation there will always be two systems of codes which are found to be identical if one interchanges the 1's and 0's for one of these systems. Thus, the complete class of augmented binary codes at any degree of augmentation comprises two systems of anti-symmetric codes.)

In constructing the next augmented set $C^2$, there is, for each of the above sets, $C^1$, a further choice of one of three characters for a prefixing code. Thus, six distinct sets are possible for $C^2$. These are:

| | |
|---|---|
| {00,01,11,100,101} | {11,10,00,011,010} |
| {1,01,0000,001,0001} | {0,10,1111,110,1110} |
| {1,00,0101,011,0100} | {0,11,1010,100,1011} |

Obviously the choice for the selection of a prefixing character increases with each new degree of augmentation, with $2^m+1$ characters available in the creation of the (m+1)th degree set. Within the constraints of choice then, it is possible to tailor, to some degree at least, the distribution of the character lengths within any given set, although as noted before at least half of the possible sets have an identical but anti-symmetric representation with all of the identical properties and size distribution characteristics.

The total number of sets within any family may be calculated using the result presented previously for expressing the size of an augmented code set. For the augmented binary codes of degree m this reduced to;

$$|C^m| = 2^m + 1 \qquad (5)$$

The number of sets in the family $F^m$ is then given by;

$$|F^m| = |C^0| \times |C^1| \, x \ldots x \, |C^m|$$

$$= \prod_{i=0}^{n} (2^i + 1)$$

IX. Minimal Code Sets

If the augmentation procedure is used repeatedly with the consecutive prefixing characters each being the smallest available code (or one of the smallest codes if more than one choice is available), then the average character size for the new set will grow minimally with each augmentation. The variation in character lengths will also be minimal although the smallest character representations will not in general be the smallest possible codes for any given degree of augmentation. However, all of the minimal sets at any level of augmentation have identical synchronization properties and serial coding efficiencies as well as identical code-length distributions. In the practical realization of systems using the augmented binary codes it is the minimal sets which will be of most interest and utility and it is these sets which will be generally considered in the examples hereinafter.

X. Code Size And Size Distributions

Clearly the lengths of each of the subsequent prefixing characters are strictly dependent on the choice of previous prefixing characters, and it has not thus far been possible to express this in a simple algebraic form. For this reason, the statistical characteristics (such as the average character size, assuming equal frequency of occurrence) of each augmented code set will need to be evaluated specifically for the set at hand.

XI. The Prefixing Characters

The prefixing characters for the sets may be derived by simply following through the construction of the codes, in each case noting these as they are selected during the augmentation process. Clearly in the construction of the minimal augmented binary codes the first two possible prefixing characters are '0' and '1', each of length 1. The next prefixing characters are of length 2 and the four possible codes are '00', '01', '10', '11' of which only three will be available for prefixes for subsequent augmentation processes depending on the previous choice/s of prefix. And so on. This is further illustrated in table 1.

The method outlined below for constructing related block codes lends itself to the determination of both the augmented binary codes and the binary prefixing characters in a systematic manner using a digital computer. It also results in a further series of related codes which will herein be called the depleted codes.

XII. A Depletion Algorithm

[The following description exemplifies the depletion process for determining a set of depletion codes. It may be noted however, that the example, which is based on the augmented binary codes does not require the steps of deleting those surplus codes whose literal characters are illegal, i.e. those codes satisfying the criterion that the literal character, interpreted to be an integer w, is greater than or equal to the integer s where s is the number of characters in the base character set.]

Storing sets of irregularly sized character codes in a system which uses a fixed word format, such as the typical digital processors in use today, can be cumbersome. In a number of cases, where code construction is systematic and if processing time is available, it is possible to use an algorithm for generating the required representation at the particular instant it is required. The augmented binary codes may be represented in a block code form which is amenable to internal manipulation within a digital processor and which may be easily transformed into the variable length representation suitable for subsequent serial transmission or storage. (Note that the example given next may be extended in kind, for augmented code sets resulting from a construction using a base character set other than the binary characters.)

Clearly, if there are $2^n+1$ codes in any augmented binary code set of degree 'n' a block code representation will require n+1 bits to cover the full set of characters. This does mean that some redundancy is inherent in the block code representation but with little consequence to the overall gain in convenience and efficiency of the resulting encoding and decoding processes.

As shown in the following example it is possible to construct all the related block-length codes and then consequently the associated variable length codes without making any reference to the augmentation algorithm proposed previously. This is done using an iterative depletion algorithm involving 'm' steps, and producing what will be called the depleted fixed-length codes of the mth degree. The following example will serve to demonstrate the algorithm.

Initially, a complete list S, of codes of length (m+1) are arranged in their respective numerically ascending order. The list of codes is then depleted according to the rules outlined hereinafter and illustrated as in the example of table 3, showing the construction of the depleted binary codes third degree denoted S[1,3,0]. (Set specification will be given as listing in order the numerical entry of the code deleted according to the steps described next)

Step 1

The codes in the list S are grouped into pairs. This is shown in the first column of table 3. A deletion is effected in each of the alternate groups positions within each pair of codes and further constrained in that a deletion must occur within the first group. In column 2, the two possible choices for this step are shown with deletion marked with a 'D' and the corresponding codes which are to be saved are marked with an 'S'. Clearly there can only ever be two possible choices for the first step, and this corresponds to the existence of the antisymmetric families of augmented codes already mentioned.

Step 2

The resulting sets S [0] and S[1], are next grouped into fours. This is shown in column 3 of table 3. For simplicity, the example is continued with set S[1] only although clearly set S[0] may be used similarly with the same rules and constraints applied. A further deletion is effected, again at corresponding positions in alternate groups and yet again with the constraint that a deletion must occur in the first group and must not occur at a position where a previous deletion has taken place. Obviously, the choice is reduced to one of the three remaining codes, since one has already been dispensed with in step 1. The possible options are shown in column 4. This yields the three distinct sets S[1,0], S[1,2], S[1,3] listed in column 5. (Of course, by using the set S[0], the three other antisymmetric sets S[0,1], S[0,2], S[0,3] are produced.)

Step 3

In the third step, the codes are again regrouped, but now into groups of 8 or $2^3$. In this last step in the construction of the depleted codes of the third degree, for the sake of brevity only S[1,3] is considered. Here a possible choice of one of five codes is available. The set S[1,3,0] for example has been produced by deleting the first possible such character, '0000'.

It is a simple process to prove the connection between the depleted fixed length codes and the augmented variable length codes and while such a proof has been omitted the details of the correspondence between these code sets are considered next and provide some useful techniques for implementing the serial encoding and decoding of the augmented binary codes. It will be clear from the above example that the steps may be extended to apply in the more general case of constructing the depleted code set of degree n.

Figure 7:
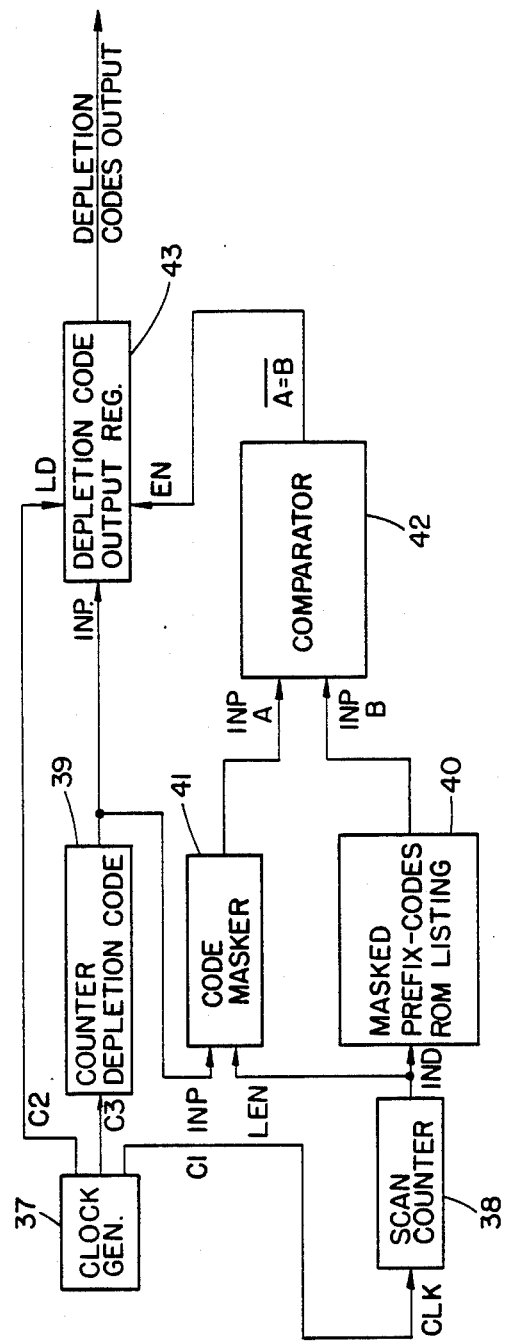
FIG. 7 is a block diagram of a depletion-code generator using Read-Only-Memory listing of masked depletion prefix-codes.

An example of apparatus for performing the steps generating depletion codes is depicted in FIG. 7.

XIII Set Size

A quick inspection of the depletion algorithm reveals that as required $(2^n+1)$ codes result from the construction where 'n' is the degree of the depletion process codes of length $(n+1)$.

TABLE 3

| set S | option 0/ 1 | set S[0] | set S[1] | option 0/ 2/ 3 | set S[1,0] | set S[1,2] | set S[1,3] | options 0/ 2/ 4/ 6/ 7 | set S[1,3,0] |
|---|---|---|---|---|---|---|---|---|---|
| 0000 | D | — | 0000 | D | — | 0000 | 0000 | D | — |
| 0001 | D 0001 | — | | | — | — | — | | — |
| 0010 | S | 0010 | 0010 | D | 0010 | — | 0010 | D | 0010 |
| 0011 | S | 0011 | 0011 | D | 0011 | 0011 | — | | — |
| 0100 | D | — | 0100 | S | 0100 | 0100 | 0100 | D | 0100 |
| 0101 | D 0101 | — | | | — | — | — | | — |
| 0110 | S | 0110 | 0110 | S | 0110 | 0110 | 0110 | D | 0110 |
| 0111 | S | 0111 | 0111 | S | 0111 | 0111 | 0111 | D | 0111 |
| 1000 | D | — | 1000 | D | — | 1000 | 1000 | S | 1000 |
| 1001 | D 1001 | — | | | — | — | — | | — |
| 1010 | S | 1010 | 1010 | D | 1010 | — | 1010 | S | 1010 |
| 1011 | S | 1011 | 1011 | D | 1011 | 1011 | — | | — |
| 1100 | D | — | 1100 | S | 1100 | 1100 | 1100 | S | 1100 |
| 1101 | D 1101 | — | | | — | — | — | | — |
| 1110 | S | 1110 | 1110 | S | 1110 | 1110 | 1110 | S | 1110 |
| 1111 | S | 1111 | 1111 | S | 1111 | 1111 | 1111 | S | 1111 |

Construction of block codes using the Depletion Algorithm Table 3 illustrates the application of the depletion algorithm in the construction of the depleted code set S[1,3,0].

XIV. Generating The Augmented Codes From The Depleted Block Codes

Figure 1:
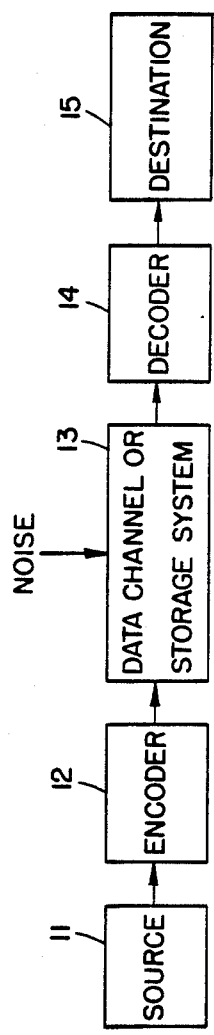
FIG. 1 is a block diagram of a data transmission or data storage system according to the present invention.
Figure 2:
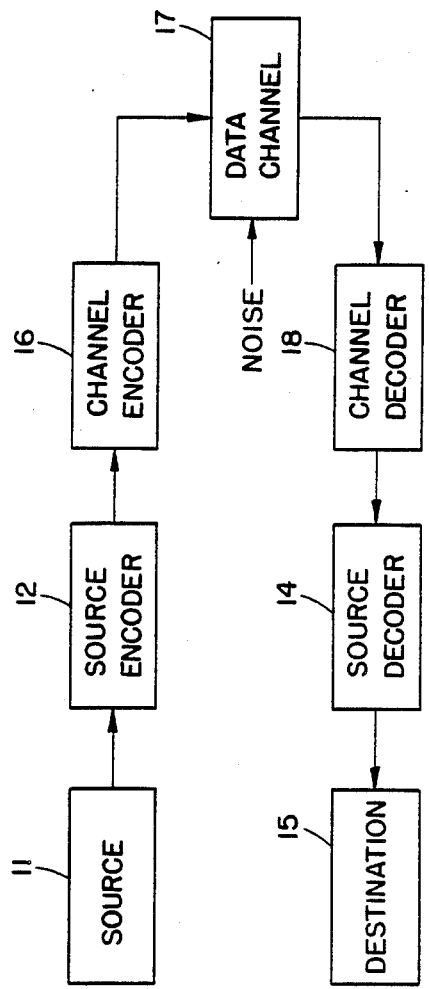
FIG. 2 is a block diagram as for FIG. 1 with the encoder and decoder being in two parts.

The following comprises an example of the process of generating the augmented codes from the depletion codes. Implicit in the relationship between the two code types is the inverse process of deriving the depletion codes from augmented codes. Examples of apparatus for performing these transformations are depicted in block form in FIGS. 8, 9a and 9b. Examples of expected kinds of application are depicted in FIGS. 1 and 2 with example detail of the kinds of variations possible in the implementation of the encoding and decoding operations depicted in FIGS. 3a, 3b, 4a, 4b, 5a and 5b.

To understand the relationship between the Depleted and Augmented code sets it is necessary to associate at each step of the depletion process, a corresponding binary prefixing code with the deleted characters in each first group. These prefixing characters may be derived as follows.

Rule 1

In any block code the least significant bit (LSB) will be interpreted literally as the LSB binary character for the corresponding augmented code; for instance in the code '0101', where the LSB is a '1' this is directly interpreted as the LSB of the corresponding variable length prefix code.

Rule 2

Each subsequent leading LSB in the block code will determine either the inclusion or omission of respective prefix characters in their respective order of selection. These can essentially only be determined in the order of selection.

In table 3, the character deleted to produce set S[1] was the code '0001'. The literal binary character '1', is then saved as the first of the prefix characters. The leading LSB, i.e. the bit adjacent to the LSB is now used to denote the presence or absence of the previously determined prefix; in this case the '1'.

In step 2, the code deleted in the first group to produce the set S[1,3] was the code '0011'. Since the leading LSB, and the LSB are each set to '1' this code is interpreted to represent a new prefix created by appending in the order dictated by the block code, the last previous prefix (a '1') appended to the literal binary character (also in this case a '1'). Thus, for the example, the new prefix is:

| first prefix | | literal bit |
|---|---|---|
| '1' | + | '1' => 11. |

This new prefix is now associated with the next leading LSB, i.e. the third bit counting from and including the LSB herein referred to as the second leading LSB. The second leading LSB then is used to represent the presence or absence of this prefixing code, '11', in the construction of subsequent codes.

Step 3, shows the construction of set S[1,3,0] with the deletion of the character '0000' Since none of the leading LSB's are set, no prefix characters are required to derive the third prefix which simply becomes the literal bit or LSB, '0'. This third prefix is noted and, as above, is associated with the next available leading LSB which is clearly the last remaining bit, in other words the MSB.

At this stage any of the residual codes shown in S[1,3,0] may be interpreted to produce the equivalent variable length augmented code. As earlier, these are converted by interpreting the individual bits of a binary depletion code as implying either the inclusion or omission of corresponding prefixes and with the LSB interpreted literally as the LSB of the resulting variable length code.

An example of the conversion from the block code '1010' to the corresponding variable length code is shown in table 4. As before, each of the bits in the block code is interpreted to indicate either the inclusion or omission of the corresponding prefix and the LSB is interpreted literally, and is directly transferred as the last bit in the sequence.

TABLE 4

| prefix codes: | 3rd | 2nd | 1st | literal bit |
|---|---|---|---|---|
| | '0' | '11' | '1' | |
| | 1 | 0 | 1 | 0 |
| | ↓ | ↓ | ↓ | |
| | 0 | — | 1 | 0 => 010 |

Block code '1010' corresponds to the augmented code '010' Table 4 illustrates the process of constructing the variable length augmented code from a fixed length depleted code.

XV. Practical Application Examples

Some example applications using the augmented binary codes are discussed briefly next showing typical implementations of serial encoding and decoding in communication and data storage systems. FIG. 1 depicts a block diagram for a general communications system of the kind considered here.

In particular it is convenient to view such a system with the encoding means or encoder and decoding means or decoder split into two as in FIG. 2. In principle many communications systems require few changes to be able to take advantage of the augmented codes and the subsequent synchronization capabilities possessed by the augmented codes herein. For example, the insertion of the extra processing blocks of FIGS. 3 and 4 in the data paths connecting the source and channel encoders and the channel and source decoders respectively of FIG. 2 suffices. The functions of these extra processing blocks are respectively (i) to encode the incoming source data into an appropriate augmented binary set, and (ii) to decode the received or replayed augmented codes to the corresponding outgoing source data sequence.

An example of a system, such as is depicted in FIG. 2 is the acoustically-coupled 300 baud terminal/modem-modem/computer link via a transmission means such as a telephone network. Here, a means such as a frequency shift keying (FSK) is used in the bidirectional channel encoder and decoder as a method for encoding asynchronous serial binary data. The binary data at the terminal/modem or modem/computer interface is most usually a 7-bit ASCII data word marked using a single (low) start bit and followed by two (high) stop bits. A sequence of characters thus encoded uses 10 bits/character and may be sent asynchronously since the process for decoding in a decoding means is cued by detection of the low start bit. For the most part character synchronization is established simply, because of the low data exchange rates. Large periods of time are spent with the data channel idle so that the presence of a character is marked unambiguously by the low start bit.

However, during periods when the data channel is working to capacity, it is much more difficult to identify with certainty the correct character boundaries. For the most part, if character synchronization is established at the start of such a transmission the data is readily interpreted, but if synchronization is for some reason lost during the course of a sustained character transmission it may not be until the transmission is complete that character synchronization can be re-established.

Loss of synchronization is invariably caused by false start-bit detection due to some channel disturbance or noise. With characters each encoded as fixed length words it is often simply a matter of chance as to whether the receiving device will recover character synchronization during a sustained transmission. The performance of the above system is improved considerably with the application of a suitable set of augmented binary codes as described by way of the example next.

XVI. Assignment Of ASCII Character Codes

Clearly, the augmented binary codes have the right kind of properties for an application such as the one above. Each of the 129 codes in the 7th degree set may be assigned to the standard 128 ASCII codes with a single character conveniently available for transmission during the times the channel is idle. Thus at all times some augmented character will be transmitted even if no actual information is exchanged.

Table 5 for example, shows one such assignment of the ASCII codes. The first column shows the printing character or control character mnemonic followed by the octal and hexadecimal representations of the ASCII binary code in column 2. The 4th and 5th and 6th columns list in octal, hex & binary, the block codes respectively corresponding to the variable-length augmented codes of column 7. The respective prefix characters for this particular construction are, in the order corresponding to the block code references:

101, 100, 11, 01, 00, 1, 0,

TABLE 5

| CHAR. | ASCII CODE (oct/hex) | BLOCK CODE (oct/hex/binary) | | | AUG. CODE (var. length binary) | NATURAL PROBABILITY OF OCCURRENCE (Total Prob.) |
|---|---|---|---|---|---|---|
| E | 040 45 | 012 0A | 00001010 | | 0000 | .06250000000000 |
| (fill) | | 013 0B | 00001011 | | 0001 | |
| sp | 145 20 | 015 0D | 00001101 | | 0011 | |
| t | 105 74 | 023 13 | 00010011 | | 0101 | × 6 |
| e | 164 65 | 025 15 | 00010101 | | 0111 | |
| T | 124 54 | 045 25 | 00100101 | | 1111 | |
| | | | | | | (= .37500000000000) |
| a | 141 61 | 016 0E | 00001110 | | 00100 | .03125000000000 |
| A | 101 41 | 017 0F | 00001111 | | 00101 | |
| o | 157 6F | 026 16 | 00010110 | | 01100 | |
| O | 117 4F | 027 17 | 00010111 | | 01101 | × 6 |
| n | 156 6E | 046 26 | 00100110 | | 11100 | |
| N | 116 4E | 047 27 | 00100111 | | 11101 | |
| | | | | | | (=.18750000000000) |
| r | 162 72 | 032 1A | 00011010 | | 010000 | .01562500000000 |
| R | 122 52 | 033 1B | 00011011 | | 010001 | |
| i | 151 69 | 035 1D | 00011101 | | 010011 | |
| I | 111 49 | 104 44 | 01000100 | | 100100 | |
| s | 163 73 | 105 45 | 01000101 | | 100101 | |
| S | 123 53 | 205 85 | 10000101 | | 101101 | |
| h | 150 68 | 052 2A | 00101010 | | 110000 | × 11 |
| H | 110 48 | 053 2B | 00101011 | | 110001 | |
| d | 144 64 | 055 2D | 00101101 | | 110011 | |
| D | 104 44 | 061 31 | 00110001 | | 110101 | |
| or | 015 0D | 065 35 | 00110101 | | 110111 | |
| | | | | | | (=.17187500000000) |
| l | 154 60 | 036 1E | 00011110 | | 0100100 | .00781250000000 |
| L | 114 40 | 037 1F | 00011111 | | 0100101 | |
| f | 146 66 | 112 4A | 01001010 | | 1000000 | |
| F | 106 46 | 113 4B | 01001011 | | 1000001 | |
| c | 143 63 | 115 4D | 01001101 | | 1000011 | |
| C | 103 43 | 123 53 | 01010011 | | 1000101 | |
| m | 155 6D | 125 55 | 01010101 | | 1000111 | |
| M | 115 4D | 145 65 | 01100101 | | 1001111 | |
| u | 165 75 | 212 8A | 10001010 | | 1010000 | |
| U | 125 55 | 213 8B | 10001011 | | 1010001 | |
| g | 147 67 | 215 8D | 10001101 | | 1010011 | × 18 |
| G | 107 47 | 223 93 | 10010011 | | 1010101 | |
| y | 171 79 | 225 95 | 10010101 | | 1010111 | |
| Y | 131 59 | 245 A5 | 10100101 | | 1011111 | |
| p | 160 70 | 056 2E | 00101110 | | 1100100 | |
| P | 120 50 | 057 2F | 00101111 | | 1100101 | |
| w | 167 77 | 066 36 | 00110110 | | 1101100 | |
| W | 127 57 | 067 37 | 00110111 | | 1101101 | |
| | | | | | | (= .14062500000000) |
| b | 142 62 | 116 4E | 01001110 | | 10000100 | .00390625000000 |
| B | 102 42 | 117 4F | 01001111 | | 10000101 | |
| v | 166 76 | 126 56 | 01010110 | | 10001100 | |
| V | 126 56 | 127 57 | 01010111 | | 10001101 | |
| k | 153 6B | 146 6B | 01100110 | | 10011100 | |
| K | 113 4B | 147 67 | 01100111 | | 10011101 | |
| x | 170 78 | 216 8E | 10001110 | | 10100100 | |
| X | 130 58 | 217 8F | 10001111 | | 10100101 | × 15 |
| j | 152 6A | 226 96 | 10010110 | | 10101100 | |
| J | 112 4A | 227 97 | 10010111 | | 10101101 | |
| q | 161 71 | 246 A6 | 10100110 | | 10111100 | |
| Q | 121 51 | 247 A7 | 10100111 | | 10111101 | |
| z | 172 7A | 072 3A | 00111010 | | 11010000 | |
| Z | 132 5A | 073 3B | 00111011 | | 11010001 | |
| lf | 012 0A | 075 3D | 00111101 | | 11010011 | |

TABLE 5-continued

| CHAR. | ASCII CODE (oct/hex) | BLOCK CODE (cot/hex/binary) | AUG. CODE (var. length binary) | NATURAL PROBABILITY OF OCCURRENCE (Total Prob.) |
|---|---|---|---|---|
| | | | | (= .05859375000000) |
| 0 | 060 30 | 132 5A 01011010 | 100010000 | .00195312500000 |
| 1 | 061 31 | 133 5B 01011011 | 100010001 | |
| 2 | 062 32 | 135 5D 01011101 | 100010011 | |
| 3 | 063 33 | 152 6A 01101010 | 100011000 | |
| 4 | 064 34 | 153 6B 01101011 | 100011001 | |
| 5 | 065 35 | 155 6D 01101101 | 100011011 | |
| 6 | 066 36 | 163 73 01110011 | 100110101 | |
| 7 | 067 37 | 165 75 01110101 | 100110111 | |
| 8 | 070 38 | 232 9A 10011010 | 101010000 | × 20 |
| 9 | 071 39 | 233 9B 10011011 | 101010001 | |
| . | 056 2B | 235 9D 10011101 | 101010011 | |
| , | 054 20 | 306 06 11000110 | 101100100 | |
| ( | 050 28 | 307 07 11000111 | 101100101 | |
| ) | 051 29 | 252 AA 10101010 | 101110000 | |
| / | 057 2B | 253 AB 10101011 | 101110001 | |
| bs | 010 08 | 255 AD 10101101 | 101110011 | |
| ht | 011 09 | 263 B3 10110011 | 101110101 | |
| ff | 014 00 | 265 B5 10110101 | 101110111 | |
| esc | 033 1B | 076 3E 00111110 | 110100100 | |
| del | 177 7F | 077 3F 00111111 | 110100101 | |
| | | | | (= .03906250000000) |
| ! | 041 21 | 136 5E 01011110 | 1000100100 | .00097656250000 |
| " | 042 22 | 137 5F 01011111 | 1000100101 | |
| # | 043 23 | 156 6E 01101110 | 1001100100 | |
| $ | 044 24 | 157 6F 01101111 | 1001100101 | |
| % | 045 25 | 166 76 01110110 | 1001101100 | |
| & | 046 26 | 167 77 01110111 | 1001101101 | |
| ' | 047 27 | 236 9E 10011110 | 1010100100 | |
| * | 052 2A | 237 9F 10011111 | 1010100101 | |
| + | 053 2B | 312 CA 11001010 | 1011000000 | |
| − | 055 2D | 313 CB 11001011 | 1011000001 | × 18 |
| : | 072 3A | 315 CD 11001101 | 1011000011 | |
| ; | 073 3B | 323 D3 11010011 | 1011000101 | |
| < | 074 3C | 325 D5 11010101 | 1011000111 | |
| = | 075 3D | 345 E5 11100101 | 1011001111 | |
| > | 076 3E | 256 AE 10101110 | 1011100100 | |
| ? | 077 3F | 257 AF 10101111 | 1011100101 | |
| @ | 100 40 | 266 B6 10110110 | 1011101100 | |
| _ | 137 5B | 265 B7 10110111 | 1011101101 | |
| [ | 133 5B | 172 7A 01111010 | 10011010000 | .00048828125000 |
| | 134 50 | 173 7B 01111011 | 10011010001 | |
| ] | 135 5D | 175 7D 01111101 | 10011010011 | |
| { | 173 7B | 316 CE 11001110 | 10110000100 | |
| | | 174 7C | 317 CF 11001111 | 10110000101 | |
| } | 175 7D | 326 D6 11010110 | 10110001100 | |
| ext- | 003 03 | 327 D7 11010111 | 10110001101 | × 12 |
| bel | 007 07 | 346 E6 11100110 | 10110011100 | |
| dc1 | 021 11 | 347 E7 11100111 | 10110011101 | |
| dc3 | 023 12 | 272 BA 10111010 | 10111010000 | |
| nak | 025 15 | 273 BB 10111011 | 10111010001 | |
| sub | 032 1A | 275 BD 10111101 | 10111010011 | |
| | | | | (= .005859375000) |
| | 140 60 | 176 7E 01111110 | 100110100100 | .00024414062500 |
| | 136 5E | 177 7F 01111111 | 100110100101 | |
| - | 176 7E | 332 DA 11011010 | 101100010000 | |
| nul | 000 00 | 333 DB 11011011 | 101100010001 | |
| soh | 001 01 | 335 DD 11011101 | 101100010011 | |
| stx | 002 02 | 352 EA 11101010 | 101100110000 | |
| eot | 004 04 | 353 EB 11101011 | 101100110001 | × 12 |
| enq | 005 05 | 355 ED 11101101 | 101100110011 | |
| ack | 006 06 | 363 F3 11110011 | 101100110101 | |
| vt | 013 0B | 365 F5 11110101 | 101100110111 | |
| so | 016 0B | 276 BE 10111110 | 101110100100 | |
| si | 017 0F | 277 BF 10111111 | 101110100101 | |
| | | | | (= .00292968750000) |
| dle | 020 10 | 336 DE 11011110 | 1011000100100 | .00012207031250 |
| dc2 | 022 12 | 337 DF 11011111 | 1011000100101 | |
| dc4 | 024 14 | 356 EE 11101110 | 1011001100100 | |
| syn | 026 16 | 357 EF 11101111 | 1011001100101 | × 6 |
| etb | 027 17 | 366 F6 11110110 | 1011001101100 | |
| can | 030 18 | 367 F7 11110111 | 1011001101101 | |
| | | | | (= .00073242187500) |
| em | 031 19 | 372 FA 11111010 | 10110011010000 | .00006103515625 |
| fs | 034 10 | 373 FB 11111011 | 10110011010001 | × 3 |
| gs | 035 1D | 375 FD 11111101 | 10110011010011 | |
| | | | | (=.0001831054687500) |

TABLE 5-continued

| CHAR. | ASCII CODE (oct/hex) | BLOCK CODE (oct/hex/binary) | AUG. CODE (var. length binary) | NATURAL PROBABILITY OF OCCURRENCE (Total Prob.) |
|---|---|---|---|---|
| rs | 036 1E | 376 FE 11111110 | 101100110100100 | .000030517578125 |
| us | 037 1F | 377 FF 11111111 | 101100110100101 | × 2 |
|   |   |   |   | (= .00006103515625) |
|   |   |   | Total prob. | (1.000000000000000) |

Table 5 lists an assignment of the 128, ASCII (American Standard Codes for Information Intercnange) character codes to seventh degree set of depleted codes and augmented binary codes.

For example consider the process of generating the augmented code for the letter 'p' having the ASCII octal representation $160_8$. This for example may be used as an index in a look-up-table or ROM (Read-Only-Memory) to locate the corresponding block code, $056_8$ shown in column 3. As demonstrated earlier the individual bits in the binary block code represent the inclusion or omission of the above corresponding prefixes, with the exception of the LSB which is in fact simply transferred over to become the LSB in the variable length code.

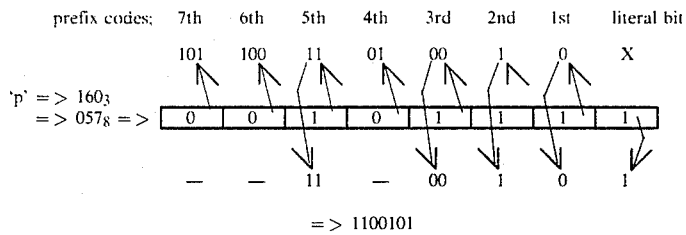

While the character assignment given in table 5 is not necessarily optimal for all computer applications it does represent a reasonable choice based largely on commonly available figures for the frequency of occurrence of the alphabetic characters. The example serves to illustrate the kinds of advantages possible when using the augmented codes.

Without making the distinction between the upper and lower case of the alphabet characters and by estimating the relative frequency of occurrence of the control characters, it has been possible to assign the ASCII characters to take advantage of the variable lengths of the augmented codes.

The '(fill)' character has been assigned one of the shortest character lengths and one in particular which will avoid a sustained error-echo condition. Since E and T are rarely found repeated as capitals they have been assigned to the augmented codes '0000' and '1111' respectively and this avoids a situation where the error-echo condition could be sustained.

In table 5 all of the alpha-numeric characters have been placed in the first half of the list and use codes of between 4 and 9 bits long. Thus, a substantially better efficiency of representation is possible for alpha-numeric text than that of the 10 bits/character used in the standard asynchronous ASCII encoding mentioned in section XV.

If the first 65 characters of table 5 are assumed to occur with equal frequency the average length is 6.95 bits/character which compares favorably with the raw 7-bit ASCII code. The bits/character represents a 44% improvement in the character transmission rate if comparing with the 10 bits/character ordinarily used. Alternatively the improvement may be compared to an increase in the bit transmission rate of from 300 baud to something greater than 430 baud. Yet all we have is change the encoding scheme.

If an evaluation is made, weighting each character length with the expected frequency of occurrence (for example the letter e occurs about 13% of the time) the average character size for text is found to approach 5.45 bits/character or equivalently an increase in efficiency of 83% over the 10 bits/character rate. This is equivalent to increasing the bit rate, assuming the existing technology in the 300 baud MODEM, to about 550 baud. It will be clear to any has worked with a 300 baud MODEM link that this is a significant improvement.

It is instructive to compare the average character size for the complete set with the assumption that each code occurs with equal frequency. This turns out to be only 8.93 bits/character and also compares favorably with the more efficient synchronous ASCII representation formed using a start bit, the 7-bit ASCII code and lastly, a single stop bit.

Ordinarily most communications systems using the augmented codes will allow some optimization to be made in terms of the frequency of use of the various characters and the variable character lengths available for their representation. In any case it should not be overlooked that the real improvement resulting from the use of these codes lies in their ability to recover synchronization following any kind of channel disturbance and essentially irrespective of the transmitted data. That the data transmission rate may also be improved through using the augmented codes herein described, is incidental and comes about primarily because of the redundancy that must be added in other coding schemes to determine correct data synchronization.

In the previous application we have ignored the question of bit synchronization. Obviously, at the character level the system behaves essentially as if it were asynchronous. However, at the bit level the system must be bit-synchronous. In the character assignment given in table 5 the codes have been ordered to minimize the condition of error-echo which by the same token maximizes the likelihood of bit transitions. Naturally this is of essence if the receiver is to maintain bit synchronization. With the given character assignment it is unlikely that more than 10-15 bits will pass by without at least one transition occurring to provide synchronization information.

Certainly this is not an impossible or even an especially difficult technical constraint to meet in terms of the accuracy of the encoder and decoder oscillator frequencies and the previous application is easily possible.

XVII. Including A Bit Rate Clock

In a more demanding communications protocol it may be necessary to include the data clock information with the data itself. One such scheme is the Bi-$\phi$-L (Bi-Phase-Level) binary encoding representation such as in the local area network 'Ethernet'. Here the clock information is provided as a transition occurring at the centre of each bit time and the direction of the transition determines the value of the data bit. A Bi-$\phi$-L data stream is obtained simply by combining the in-phase data-clock with the NRZ data using a exclusive-or function.

By combining the augmented codes with the Bi-$\phi$-L encoding scheme a particularly powerful method of serial data results. Bit synchronization is achievable at the first 1/0 or 0/1 data bit transition using standard, existing techniques and character synchronization follows naturally according to the principles underlying the augmented codes.

The combination of the Bi-$\phi$-L encoding scheme and the augmented binary codes is by comparison with the FSK application in that an error condition is more easily distinguished by the loss of the clock information. In the earlier example the encoding system does not contain enough information for the decoder itself to realize it may be decoding noise. In this Bi-$\phi$-L encoding scheme it is possible to determine with absolute the first character guaranteed to be correct following a break in the transmission, where the break may be detected from the loss of the data clock. Of course, characters decoded following the break and before the first guaranteed character may well be correct but cannot with certainty be assumed to be valid.

XVIII. A System Using Intermediate Augmented Code Sets

In a conventional baud modem, the synchronous transmission of sixteen distinct character states may be achieved through amplitude and phase modulation of a carrier tone at a line signalling speed of 2400 symbols per second. Each of the 16 phase/amplitude modulated states corresponds in turn to the 4-bit codes '0000', '0001', ... '1111'. The transmission of an eight bit binary code representing an ASCII character for example is achieved using a pair of the phase/amplitude modulated states although it will be clear that some concern must be given to ensuring correct synchronization of the data during a sustained transmission in order that the message be transposed unambiguously upon receipt. In general the data will be packaged in such a manner as to ensure correct synchronization although this does imply some loss in efficiency in the message transmission rates.

Figure 11A:
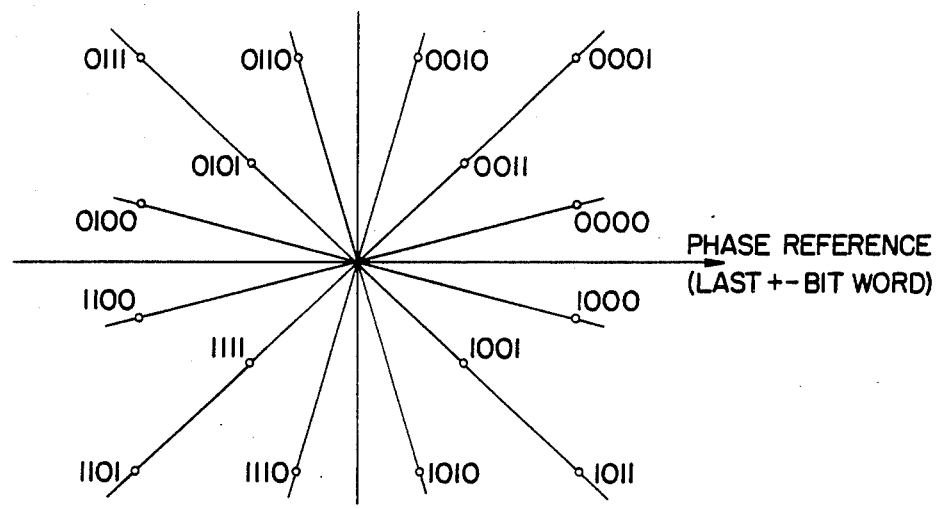
FIG. 11a shows the phase/amplitude states of a conventional 16-QAM system.

The above modulation system, sometimes designated 16-QAM (Quadrature Amplitude Modulation), operates synchronously with the data clocked by a phase modulation in the carrier tone occurring at unit time intervals. In FIG. 11a, the x-axis is taken to be the relative phase of the carrier tone during the last previous 4-bit character and in the following symbol period the phase of the character is shifted to one of the 12 radial phase vectors shown at 30 degree intervals and offset from the x-axis by a further 15 degrees. These phase states offer a possible twelve data states with four of the twelve further augmented by two levels of amplitude modulation of the carrier to produce a more suitable number of sixteen amplitude/phase states.

Figure 11B:
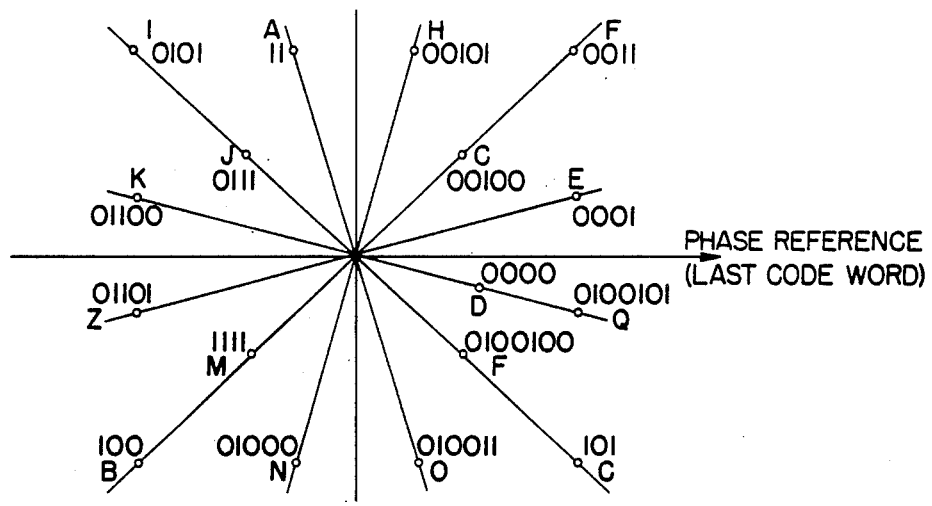
FIG. 11b shows the phase/amplitude states in an improved version using the intermediate augmented codes of table 6.

In relation to the augmented binary codes an improved version can be considered based on the same concepts of Quatrature Amplitude Modulation of a carrier tone. FIG. 11b shows five of the twelve phase states with two levels of of amplitude modulation producing a complement of seventeen states labelled A through Q and shown with the augmented binary codes of the fourth degree of table 6. Table 6 also includes the 5-bit block-code or depletion code representations for reference.

TABLE 6

| Augmented Binary Codes Of The Fourth Degree | | |
|---|---|---|
| Character designation | binary equivalent | block code representation. |
| A | 11 | 00101 |
| B | 100 | 00110 |
| C | 101 | 00111 |
| D | 0000 | 01010 |
| E | 0001 | 01011 |
| F | 0011 | 01101 |
| G | 00100 | 01110 |
| H | 00101 | 01111 |
| I | 0101 | 10011 |
| J | 0111 | 10101 |
| K | 01100 | 10110 |
| L | 01101 | 10111 |
| M | 010000 | 11010 |
| N | 010001 | 11011 |
| O | 010011 | 11101 |
| P | 0100100 | 11110 |
| Q | 0100101 | 11111 |

Table 6 lists an intermediate augmented binary set.

From earlier results it will be immediately apparent that the same code set is related to the augmented binary codes of the seventh degree shown in table 5.

A further three augmentations performed using the 17-character set in table 6 yields the full 129 codes given in table 5. Codes such as in table 6 will herein be said to be intermediate to those of a higher degree of augmentation, such as in this case the codes of table 5.

In this example the prefix characters to be used in consecutive augmentations to obtain the codes in table 5 are A, B and C respectively of table 6. It will be obvious the block codes of table 5 contain, as the low order bits, the corresponding block codes listed in table 6. Since the characters, A, B and C in table 6 have special significance in this example as prefix characters they have been assigned complementary positions on the phase-plane (FIG. 11b) maximizing the margin of phase discrimination and in turn minimizing the possibility of sustaining an error condition resulting for example from the mistaken substitution of one prefix for another. The remaining characters in the 17 character set have been assigned arbitrarily, although it should be noted that the '(fil)' character '0001', of table 5 which corresponds to 'E' of table 6 represents an advance in the carrier phase of 15 degrees every unit time period.

Thus, it is possible to transmit all of the ASCII character codes in terms of the intermediate characters of table 6. Depending on the particular ASCII character being encoded, these will form as one, two, three or at most four of the intermediate characters.

Unfortunately, an optimal assignment of alphabetic and other characters as in table 5 does not necessarily produce a correspondingly optimal assignment at the related intermediate character level. In this example, this may be observed in the block codes of table 5 where the three MSB's signify the omission or inclusion of the respective prefix characters A, B or C of table 6. The presence of a '1' in at least one of these three positions implies that a pair of intermediate characters will be required for the transmission. If two of the positions are set to '1' three intermediate characters will be required for the transmission, and, finally, if all three MSB's are set to '1', four intermediate characters will be required.

Inspection of table 5 then shows that some of the characters early in the list such as 'n' and 'N' will be represented by two intermediate characters whereas the subsequent characters 'r', 'R', 'i' and even 'l' and 'L' which occur with lower frequency result in single character representations. However, a re-ordering of characters to correct for this may not gain much and will certainly produce only a second-order effect in the improvement of efficiencies which will likely be of less interest than that of the convenience in maintaining the correspondence between the character assignments of tables 5 and 6.

In comparing the encoding efficiency using the given intermediate augmented character set with that possible in a 16-QAM modem, it will be clear that at best only marginal improvments are possible, and in some applications the 17-state transmission scheme may be less efficient. The comparison made here does not include consideration of the overheads required in the conventional 16-QAM modem ensuring character synchronization, a problem which is clearly simplified by using the intermediate augmented codes. The inclusion of this consideration would improve the figures of this comparison further in favor of the scheme proposed here.

If the alpha-numeric characters shown in the first half of table 5 are transmitted with equal frequency an average of 1.96 intermediate characters will be required compared of 2.0 characters for the 16QAM modem. This represents only a 2% improvement. The average character size for the complete assuming equal frequency of use is 2.54 intermediate characters per character which shows a 26% garn in efficiency in opting for automatic character synchronization capability. All in all, it appears that such a scheme would very well be suitable for a number of applications with little loss in data efficiency and a much improved capability for character synchronization.

XIX. Determining Character-Correct Synchronization

An algorithm can be developed for determining with certainty character-correct synchronization i.e. the point following which all decoded characters are guaranteed correct. The algorithm provides a basis for evaluating the expected synchronization delays in which a probability transition matrix P is used to describe the likelihood of level transitions as shown in table 8.

Finally, the concepts are applied to the problem of determining synchronization in conventional telemetry streams. In an example a procedure, considered to be optimal for such an application, is developed and demonstrated.

The example showing the construction of the code set S[1,3,0] of the 3rd degree, using the depletion algorithm furnished as in table 3 will suffice to demonstrate the development of an algorithm for determining character-correct synchronization. Only the sets pertaining directly to the construction of the desired depleted code set need be considered. Thus, in considering the synchronization algorithm for the set S[1,3,0] in table 3 only the sets S, S[1], S[1,3], and S[1,3,0] are required.

The procedure developing the synchronization algorithm begins with the purging of all of the non-essential codes which may be identified as being those following each first group-boundary in each of the respective lists. The result of the purge in the sets S, S[1], S[1,3] and S[1,3,0] of table 3 is shown below in table 7.

TABLE 7

Clearing The Non-essential Codes

| | | | | | | |
|---|---|---|---|---|---|---|
| 0000 | | 0000 | | 0000 | D | — |
| 0001 | D | — | | — | | — |
| | | 0010 | | 0010 | | 0010 |
| | | 0011 | D | — | | — |
| | | | | 0100 | | 0100 |
| | | | | — | | — |
| | | | | 0111 | | 0111 |
| | | | | | | 1000 |
| | | | | | | 1010 |
| | | | | | | 1100 |
| | | | | | | 1110 |
| | | | | | | 1111 |

Table 7 illustrates the clearing of the non-essential codes in preparation for establishing a transition diagram for determining character-correct synchronization.

The 'D' markings have been preserved during this step as they are important in determining available transitions between the code lists in the process of determining synchronization. The respective lists have been labelled for convenience as level 0 through to level 3 and correspond to the augmented codes of the corresponding degree.

Allowable transition paths are indicated by the insertion of arrows connecting corresponding codes in adjacent lists, and terminating the path at any code flagged by a 'D'. Determining character-correct synchronization involves starting in level 0 and then, when an appropriate code is received, moving to the highest possible level indicated by the corresponding transition. At the point when level 3 is reached character correct synchronization has been established.

TABLE 8

Determining Valid Level Transitions

| level 0 | | level 1 | | level 2 | | level 3 |
|---|---|---|---|---|---|---|
| 0000 | → | 0000 | → | 0000 | D | — |
| 0001 | D | — | | — | | — |
| | | 0010 | → | 0010 | → | 0010 |
| | | 0011 | D | — | | — |
| | | | | 0100 | → | 0100 |
| | | | | — | | — |
| | | | | 0110 | → | 0110 |
| | | | | 0111 | → | 0111 |
| | | | | | | 1000 |
| | | | | | | 1010 |
| | | | | | | 1100 |
| | | | | | | 1110 |
| | | | | | | 1111 |

Table 8 illustrates the determining of the valid transitions.

The process of determining character-correct synchronization always begins with a character search from the left-most list, level 0. A level transition, where each level corresponds to a set whose degree of augmentation is given by the level number (as in table 8), may occur such that the level is always increased by a transition. Each transition is initiated by the receipt of a code listed in the current level for which a transition path is shown corresponding to that particular code. Once a transition is initiated the indicated path is followed until the right-most position is reached whether terminated by a 'D' or simply because one has reached level 3.

While it is certainly possible to limit the transition step size to single level increments the most efficient process for determining synchronization follows from always moving to the right-most level attainable for each given transition.

Table 9 shows the equivalent information of table 8 but with the block codes replaced with the corresponding variable length codes produced using the prefix codes 1,11,0 for the set S[1,3,0].

TABLE 9

| Augmented Code Synchronization Search | | | |
|---|---|---|---|
| level 0 | level 1 | level 2 | level 3 |
| 0 → | 0 → | 0 | D — |
| 1 D | — | — | — |
| | 10 → | 10 → | 10 |
| | 11 D | — | — |
| | | 110 → | 110 |
| | | 1110 → | 1110 |
| | | 1111 → | 0111 |
| | | | 00 |
| | | | 010 |
| | | | 0110 |
| | | | 01110 |
| | | | 01111 |

Table 9 lists the augmented code sets in example of a completed transition diagram.

For example, assume for the moment that a break has occurred in the transmission of a serial binary stream of data encoded using the augmented set S[1,3,0], and that, following the resumption of transmission, it is necessary to determine character-correct synchronization. If, following the break, the first bit received is a '0' then starting Level 0 it is found that the code '0' listed provides a transition path leading all the way through to level 2. The code search now continues using the level 2 character-codes. To proceed successfully through to level 3, either a '10', '110', '1110' or a '1111' must be received.

Alternatively, if a '1' occurs immediately following the break while this is also listed in level 0, no transition path is available for a level shift and the search remains in level 0.

It will be apparent that in this particular transition map a code search will never take place at level 1, unless one specifically chooses to pause at the intermediate position on the path leading from level 0 through to level 2 corresponding to the augmented code '0'. This is simply a consequence of the particular construction of the set S[1,3,0]. In the construction of the minimal sets of augmented binary codes however, a path structure is produced enabling all of the intermediate levels to be accessed form preceding levels, although particular synchronization paths may well skip intermediate levels in the course of synchronization. A further example involving the 7th degree codes introduced earlier is given next.

The partial list of the depleted codes produced in constructing the 7th degree codes of table 5 are shown in table 10 with the non-essential codes erased in accordance with the procedure outlined earlier. At each level of the depletion process the first available option for deletion was chosen forming the minimal 7th degree set S[0,1,2,3,5,6,7].

TABLE 10

| Partial List Of 7th Degree Depleted Codes | | | | | | | |
|---|---|---|---|---|---|---|---|
| set S | set S[0] | set S[0,1] | set S[0,1,2,] | set S[0,...,3] | set S[0,...,5] | set S[0,...,6] | set S[0,...,7] |
| 00000000 D | — | — | — | — | — | — | — |
| 00000001 | 00000001 D | — | — | — | — | — | — |
| | 00000010 | 00000010 D | — | — | — | — | — |
| | 00000011 | 00000011 | 00000011 D | — | — | — | — |
| — | — | — | — | — | — | — | — |
| | | 00000101 | 00000101 | 00000101 D | — | — | — |
| | | 00000110 | 00000110 | 00000110 | 00000110 D | — | — |
| | | 00000111 | 00000111 | 00000111 | 00000111 | 00000111 D | — |
| — | — | — | — | — | — | — | — |
| | | | 00001010 | 00001010 | 00001010 | 00001010 | 00001010 |
| | | | 00001011 | 00001011 | 00001011 | 00001011 | 00001011 |
| | | | . | . | . | . | . |
| | | | etc | etc | etc | etc | etc |

Table 10 show the partial lists for the transition diagram for the codes listed in table 5.

From this table the partial list of variable length codes is constructed and the transition paths marked.

TABLE 11

| Transition Map For 7th Degree Augmented Codes Of Table 5 | | | | | | | |
|---|---|---|---|---|---|---|---|
| level 0 | level 1 | level 2 | level 3 | level 4 | level 5 | level 6 | level 7 |
| 0 D | — | — | — | — | — | — | — |
| 1 → | 1 D | — | — | — | — | — | — |
| | 00 → | 00 D | — | — | — | — | — |
| | 01 → | 01 → | 01 D | — | — | — | — |
| | | 11 → | 11 → | 11 D | — | — | — |
| | | 100 → | 100 → | 100 → | 100 D | — | — |

TABLE 11-continued

Transition Map For 7th Degree Augmented Codes Of Table 5

| level 0 | level 1 | level 2 | level 3 | level 4 | level 5 | level 6 | level 7 |
|---------|---------|---------|---------|---------|---------|---------|---------|
|         |         | 101 →   | 101 →   | 101 →   | 101 →   | 101 D   | —       |
|         |         |         | —       | —       | —       | —       |         |
|         |         |         | 0000 →  | 0000 →  | 0000 →  | 0000 →  | 0000    |
|         |         |         | 0001 →  | 0001 →  | 0001 →  | 0001 →  | 0001    |
|         |         |         | . →     | . →     | . →     | . →     | .       |
|         |         |         | etc     | etc     | etc     | etc     | etc     |

Table 11 shows the partial lists of the augmented codes for the transition diagram for the codes listed in table 5.

Using this table it is possible to form a probability transition matrix P, expressing the expected likelihood of level transitions. Calculations using the matrix P show that the expected synchronization delay is less than 12 bits for the above example.

Essentially, any data handling system using augmented codes in the decoding apparatus, as illustrated in 4a and 4b, may include optionally further apparatus for performing character synchronization monitoring and decoding control, as described above and this is further illustrated in FIGS. 5a and 5b.

XX. Closed Code Rings

The codes herein presented have still further utility in applications involving closed code rings. An example of a closed code ring, such as is shown in table 14, may be formed by connecting the two ends of a finite code string W {$C^0$}, such as the following which has been coded using an augmented binary code of the seventh degree.

If one traverses the string starting at any arbitrary point and continuing indefinitely in the one direction, say clockwise for example, then one may consider the binary sequence which results to be a positively unbounded sequence and which will therefore be amenable to application of the codes herein described.

It will be clear then that following a short period of synchronization the decoded sequence of data from the ring will be unique and repeat precisely with each completed cycle. Further it will be clear that exactly an integral number of characters is decoded from the ring regardless of the size of the ring, provided that the ring is not smaller than some integer lower bound a corresponding in some manner to the augmentation set in use.

TABLE 12

Forming A Closed Code Ring

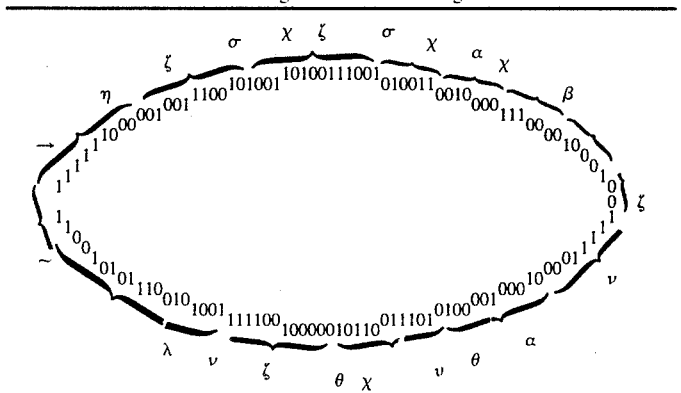

Table 12 show the construction of a binary closed code ring.

In table 12 the ring is decoded using table 5. If the ring is decoded in the clockwise direction starting at the point of connection of the two ends of the above finite string W{$C^0$} then the character string "This is a binary ring." results.

```
  →    η      ζ      σ    χ     ζ     σ    χ    α    χ    β      ζ
  1111 110000 010011 100101 0011 010011 100101 0011 00100 0011 10000100 010011

ν    α     θ      υ     χ      θ    ζ    ν    λ     ~
  11100 00100 010000 1010111 0011 010000 010011 11100 1010011 101010011
```

TABLE 13

Decoding The Closed Code Ring Using TABLE 5

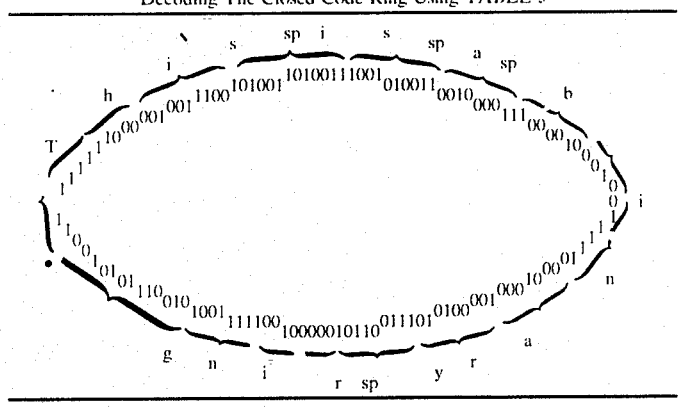

Table 13 illustrates decoding the ring using codes of table 5.

If the ring is decoded starting at some arbitrary point then following a short period of synchronization, usually two or three characters long, character-correct synchronization will have occurred and the correct string resumes. This is shown for example in table 14.

TABLE 14

Decoding From Some Arbitrary Starting Point

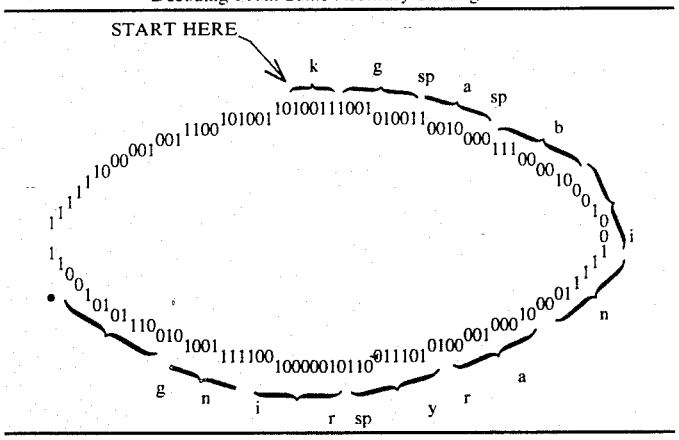

Table 14 illustrates synchronization of the decoding process in the case of starting at some arbitrary point on the ring.

Many applications of this nature are possible using the codes herein described, and include shaft encoders, magnetic disk storage systems, bubble memories, charge coupled systems, dynamic refresh memories, and son on. Also possible applications include methods or apparatus involved in the cataloguing and processing of DNA sequences, particularly closed ring DNA sequences such as in plasmids or bacteriophages.

XXI. Further Applications

The power of the augmented codes and the related block codes should be clear. If a message or information string comprising a sequential listing of symbolic characters be they electronic represented or whatever, is encoded using a coding scheme such as described herein, then the message may be transmitted and stored for subsequent recovery with the ability for character synchronization to be established and maintained even in the presence of occasional channel disruptions.

The significance of the codes lies in the fact that each has been unambiguously defined in terms of a serial representation of base characters according to algorithms herein detailed.

Examples included here show the codes to be particularly suitable for serial transmission or storage of serial data. A depletion algorithm provides a convenient method of constructing and manipulating the sets of augmented codes in machines using fixed word sizes.

Certainly the complete decoding and encoding processes could be implemented in a single programmable silicon ship preferably with a suitable interface for an 8-bit microcomputer, providing all of the convenience of and a superior performance to the traditional UART's (Universal Asynchronous Receiver and Transmitter) and USART's (Universal Synchronous and Asynchronous Receiver and Transmitter).

The coding system of the present invention would be used in applications such as general digital encoding, remote computer and computer terminal and peripheral interface, data/text transmission and storage, disk memory systems, magnetic tape systems, laser disk systems and so on. Further applications to cyclical systems have been suggested earlier and include, shaft encoders, tachometers, DNA cataloguing and string searching, and so on.

A further very significant area for application of the augmented codes is in conjunction with the digitizing of analog information and subsequent encoding for transmission or storage. This will have an impact on voice transmission systems, music recording systems, video systems and so on.

Still another important application includes using the codes for the construction of variable length instructions for micro-computers, computers and/or other processors such that the accidental issinterpretation of bus data is partially compensated for by the assurance that the processor will after several instructions resume the execution of correct program material. This will be especially important where digital processors are used in electrically noisy environments and where data integrity is of particular significance.

In the area of digital processing, the codes will be useful especially in applications involving string or pattern searches within sequential information or data. Here the string handling apparatus may utilize the synchronization capabilities of the codes to pack the sequential decoded data using the depletion code representations into fixed word size storage elements. The data processing system may then perform standard algorithms for pattern searching on the depletion code sequences with improved storage and processing efficiencies.

XXII. Further Definitions Of Terms

A character set C will herein be called complete if it contains all symbols necessary to represent a desired class of character strings, S{C}. The alphabet for example, is not a complete set since further punctuation and delimiting characters are required to support correct syntax in the English language, whereas the ASCII codes used in conjunction with computer terminal communications systems do form a complete character set.

A character sequence, S{C}, defined on the character set C, will herein be called positively unbounded if for every character in S{C} there exists a subsequent character.

For example;

$D_0 D_1 D_2 \ldots D_n$ for $n \to$ infinity forms a positively unbounded sequence

XXIII. Code Theorems And Proofs

Theorem 1 (Existence)

For any arbitrary positively unbounded sequence of characters S{$C^0$} there exists a corresponding representation S{$C^1$} in terms of the augmented character set $C^1 = T(C^0, D_i^0)$. Furthermore, if $C^0$ is a complete set then the corresponding augmented character set $C^1$ is also complete.

Proof:

For the first part of the theorem, it is sufficient to show that any arbitrary sequential pair of characters from a base set $C^0$ can be expressed equivalently as either one or two characters from the augmented set, $C^1$. Three possibilities exist;

(a) Clearly (using the notation from section I), if a character $\alpha$ pair starts with the prefixing character, then a character from the second part of the augmented list may be found to satisfy the representation.

(b) If neither of the characters in the pair is the character $\alpha$, then the equivalent representation will comprise two characters, each selected from the first part of the augmented list.

(c) If the first character is not the prefixing symbol $\alpha$, but the second is, then two characters are required for the representation. The first character clearly will be found in the first part of the augmented list while the second character, will be found in the second part of the augmented list and will be determined by the immediately subsequent character following the character pair.

The second part of the theorem on completeness follows immediately. If $C^0$ is complete then by definition $C^0$ is sufficient to represent all of the desired character strings, S{$C^0$}, and since we have proved by construction that there exists for each of these a corresponding representation using $C^1$, then $C^1$ must also be complete.

The next theorem is important for the proof of the theorem on automatic synchronization although proof of this theorem is trivial and has been omitted for sake of brevity.

Theorem 2 (Uniqueness)

If a string $S_a${$C^1$} defined on the character set $C^1 = T(C^0, D_i^0)$, represents some positively unbounded string S{$C^0$} defined on $C^0$, and if $S_b${$C^1$} is another such set then $S_a${$C^1$} and $S_b${$C^1$} are identical in every way and we may write;

$$S_a\{C^1\} = S_b\{C^1\} = S\{C^1\} = [S\{C^0\}]$$

This last statement may be interpreted as saying S{$C^1$} is the decoded character string corresponding to S{$C^0$}, or that S{$C^0$} is the encoded character string corresponding to S{$C^1$}.

For the next theorem, a notation is required for expressing the sequential combination of both a finitely bounded character sequence W{C} and a positively unbounded character sequence S'{C} resulting in the positively unbounded character sequence S{C}. If a bounded character sequence W{C} is appended to the start of an unbounded character sequence S'{C} a positively unbounded character sequence S{C} is produced and we may say that S'{C} is contained in S{C}. The relationship between these sequences may be algebraically represented as in the following:

$$S\{C\} = W\{C\} + S'\{C\} \qquad (6)$$

or alternately:

$$S'\{C\} = S\{C\} - W\{C\}$$

where the order of appearance of the symbolic references to the sequences is important in defining the relationship of the sequences with respect to one another. In the above equations the '+' is used to denote the process of appending one sequence to another while the '−' denotes the notion that one sequence may be extracted from another and assumes that this is performed with both sequences left-justified. For example:

if $S'\{C\} = D_1 D_2 D_3 \ldots D_n$ for $n \to$ infinity and $W\{C\} = D'_1 D'_2 D'_3$ then $S\{C\} = W\{C\} + S'\{C\}$ $\quad = D'_1 D'_2 D'_3 D_1 D_2 D_3 \ldots D_n$ Character sequence subtraction may be performed according to the second equation $S'\{C\}=S\{C\}-W\{C\}$ with the sequences left-justified as shown:

|  | | sequences left-justified |
|---|---|---|
| $S\{C\}$ | | $D'_1 D'_2 D'_3 D_1 D_2 D_3 \ldots D_n$ |
| $- W\{C\}$ | $=>$ | $- D'_1 D'_2 D'_3$ |
| $S'\{C\}$ | | $D_1 D_2 D_3 \ldots D_n$ |

Theorem 3 (Automatic Synchronization Capability)

Let $S_a\{C\}$ and $S_b\{C\}$ be two positively unbounded character sequences such that;

$$S_a\{C\} = W_a\{C\} - S'\{C\}$$

$$S_b\{C\} = W_b\{C\} - \{S'\{C\}$$

where $W_a$ and $W_b$ are any two distinct (i.e. $W_a \neq W_b$), finitely bounded character sequences satisfying the equations (6). Then there exists a decoded sequence $S''$ defined on the augmented character set $C^m = T^m(C)$ such that for;

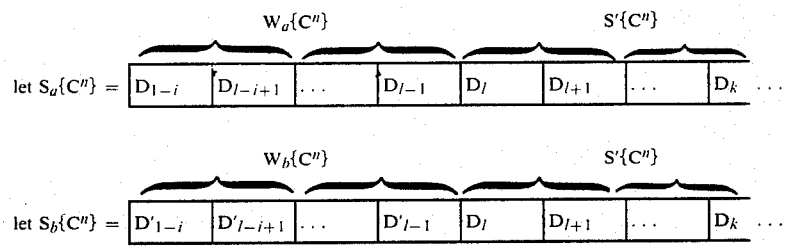

$$S_a\{C^m\} = [S_a\{C\}]^m$$

$$S_b\{C^m\} = [S_b\{C\}]^m$$

we may write;

$$S''\{C^m\} = S_a\{C^m\} - W'_a\{C^m\} = S_b\{C^m\} - W'_b\{C^m\}$$

where $W'_a$ and $W'_b$ are distinct finitely bounded sequences, $W'_a \neq W'_b$.

(Note; Since the decoding process is constrained by the character set as determined by the particular augmentation used in the set construction, $W'_a$ and $W'_b$ may not necessarily correspond precisely to the decoded forms of the respective character sequences $W_a$ and $W_b$.)

The implication of the above theorem is that for two positively unbounded character sequences which differ at some point in a finite number of characters (such as would be the case with a transmitted sequence and a received version corrupted by noise for example), there is at some time later a decoded portion of the sequence which is identical for both, and therefore corresponding to the intended message. Thus, automatic character synchronization is asserted. The following proof suggests a means for determining just how few characters are required to be decoded before this synchronization occurs, and provides insight into the phenomenon of error-echo which may result during the decoding.

Proof

To prove this theorem, it must be shown that in the two character sequences $S_a$ and $S_b$ and for the portions of these which are the same i.e. $S'\{C\}$, the decoding operation recovers at least one common character boundary during the sequence $S'$. By the uniqueness theorem then, the code following this boundary will be uniquely represented by a character sequence denoted $S''\{C^m\}$.

First it is shown that, for initial sequences $S_a\{C^n\}$ and $S_b\{C^n\}$ defined on character sets of an augmentation degree $m=n$, a decoded sequence $S''\{C^{n+1}\}$ exists. Then by induction, the results may be extended to cover the more general case. The notation used in the augmentation definition of section I will be used again here. Let $S_a$ and $S_b$ be defined as follows;

Now consider the decoding process commencing immediately following the interface of $W$ and $S'$, in other words at the character $D_1$. There are two cases to consider;

$$D_1 \neq \alpha \qquad (i)$$

Clearly, as shown in FIG. (1), the character boundary $D_1/D_{l+1}$ terminates the decoded character $D_m$ of the augmented $C^{n+1}$. This will be true for both $S_a$ and $S_b$ since the sequence starting $D_1 D_{l+1} \ldots$ is common to both. But by the uniqueness decoded sequence must then be common to both $S_a\{C^{n+1}\}$ and $S_b\{C^{n+1}\}$. Thus, there exists a decoded string $S''\{C^{n+1}\} = D_m D_{m+1} \ldots$ satisfying equations (6).

During the decoding following the character boundary, it is convenient to assign $D_m = D_1$. This may be in error but certainly in doing so synchronization will have been established simply as a matter of course by the decoding operation.

TABLE 15

Synchronization: Case (i), $D_1 \neq \alpha$

| $S_a\{C^n\}$ | $D'_{l-i}$ | $D'_{l-i+1}$ | ... | $D'_{l-1}$ | $D_l$ | $D_{l+1}$ | ... |
|---|---|---|---|---|---|---|---|

With $W_a\{C^n\}$ spanning $D'_{l-i}$ through $D'_{l-1}$, and $S'\{C^n\}$ spanning $D_l$, $D_{l+1}$.

| $S_a\{C^{n+1}\}$ | ... | $D_{m-1}$ | $D_m$ | $D_{m+1}$ |
|---|---|---|---|---|

With $W_a\{C^{n+1}\}$ and $S''\{C^{n+1}\}$.

$D_1, D_{1+1}, \ldots D_{1+k} = \alpha, D_{1+1} \neq \alpha$ (ii)

Table 15 illustrates the synchronization of augmented codes for case 1 in the proof of theorem 3.

As above $D_{1+k+1}$ marks end of a decoded character $D_{m-1}$. By working backwards through the sequence in FIG. 2 one may certainly conclude that $D_{m-1} = D_{1+k-1} \, D_{1+k}$, $D_{m-2}Y = D_{1+k-3} \, D_{1+k-3} \, D_{1+k-2}$, $D_{m-3} = \ldots$ and so on until we reach the character $D_1$. Depending on whether k is even or odd, the boundary assignments at the interface between $W_a\{C^n\}$ and $S'\{C^n\}$ and the corresponding decoded characters in $S_a\{C^{n+1}\}$ may not be clear.

Certainly it has been shown that there exists a common character boundary at $D_{k+1}/D_{k+1+1}$ and it suffices for the proof that $S''\{C^{n+1}\} = D_{k+1}D_{1+1+1} \cdots$ exists.

However, a more interesting question is, what happens when we decode starting with the character $D_{m-i} = D_1 D_{1+1}$? Depending on whether K is even or odd two possible situations develop at the character $D_{1+k}$ which as already stated, marks, with absolute certainty, the end of a common character boundary. If k is odd we will have $D_m = D_{1+k-1} D_{1+k}$. If k is even $D_m = D_{1+k}$. Obviously, depending on how the sequence $S_a$ is divided, between W and S' it is possible that the decoded characters $D_{m-i}$ through to $D_m$ may be phase shifted by one place. This does not cause a problem for the decoded characters $D_{m-i} \ldots D_{m-1}$ since we have by assumption $D1, D1+1 \ldots, D1+k=\alpha$, but at $D_m$ an error may be produced as a result of the arbitrary choice of the starting point. This delayed occurrence of an error, or error-echo as it will be called, is obviously not any more serious than the error produced in case (i) by the arbitrary assignment of the initial character $D_m$. What is important is that synchronization has been achieved again by simply continuing the decoding process. No more than one incorrect character is generated for this case where we have only one level of augmentation relating the sets $C^n$ and $C^{n+1}$.

Table 16 illustrates the synchronization of augmented codes for case (ii) in the second part of the proof of theorem 3.

Thus, existence of the character sequence S" for character sets differing by only one degree of augmentation has been shown. It is now necessary to prove the result for the general case when m levels of augmentation are involved. This follows easily by induction.

From the above, one may conclude that for $S_a\{C^0\}$ and $S_b\{C^0\}$ satisfying the constraints of eqns (7) there exist the corresponding sequences $S_a\{C^1\}$ and $S_b\{C^1\}$ which also satisfy eqns (7). Accordingly, there must exist a set $S''\{C^2\}$. Clearly, this process may be repeated indefinitely thus completing the proof.

Lemma:

For the Augmented Binary code sets, there are always two codes having maximal length and corresponding to the inclusion of the full complement of prefixing codes.

Proof

It is clear when examining the depletion algorithm that at no point can the last two codes in the set be deleted. In these two codes all of the leading LSB's (i.e. all bits other than the LSB) are set to '1' and therefore correspond to the inclusion of all prefixes. Thus, it is clear that these two codes represent the largest possible combination of prefixes of any of the variable length codes listed.

XXIV. Further Description Of The Drawings

FIGS. 1–10 represent simplified block diagrams of means and methods for encoding and decoding sequential information in data handling systems. The block diagrams may represent hardware implementations, firm wired software implementations, or purely software implementations, in a multi-purpose digital processor. They are intended to be representative charac-

TABLE 16

Synchronization: Case (ii)

| $S_a\{C^n\}$ | ... | $D_1$ | ... | $D_{l+k-1}$ | $D_{l+k}$ | $D_{l+k+1}$ | ... |
|---|---|---|---|---|---|---|---|

With $W_a\{C^n\}$ and $S'\{C^n\}$.

| $S_a\{C^{n+1}\}$ | $D_{m-i}$ | ... | $D_{m-1}$ | $D_m$ | $D_{m+1}$ | ... |
|---|---|---|---|---|---|---|

With $W'_a\{C^{n+1}\}$ and $S''\{C^{n+1}\}$.

terizations of means for implementing the generic methods set forth in the specification and claims.

FIG. 1 illustrates a block diagram of a communications or storage system utilizing a source, which may be the output of a CPU, or a keyboard wherein the output of the source 11 is passed to an encoder 12 for converting the source code into a variable length augmented code. The box delineated 13 in FIG. 1 represents either a data channel or a storage system. As was pointed out earlier, the variable length augmented code is particularly suited for data transmission over data channels. The fixed length block code or depleted code is particularly suited for the storage system. The decoder 14 is the converse of the encoder 12 and restores the variable length code to source code or fixed length block code depending upon the destination 15. Destination 15 may be another CPU, a disk storage means, or a CRT utilizing ASCII codes.

FIG. 2 represents a more conventional data communication system having a source 11 and a source encoder 12 which converts the source code eminating from 11 into the variable length augmented code. Channel encoder 16 represents a modem or other means of converting binary digital pulses into analog signals for transmission over a conventional data link 17 such as a telephone line or a microwave link. The channel decoder 18 is also a modem which translates the variations in frequency (from frequency shift keying) or variations in phase and amplitude (from a quadrature amplitude modulation) into 1, 2, or 4 bit groups of binary data for the source decoder 14. Source decoder 14 then converts the variable length augmented code to either a source code or a fixed length depleted block code for destination 15.

Figure 3A:
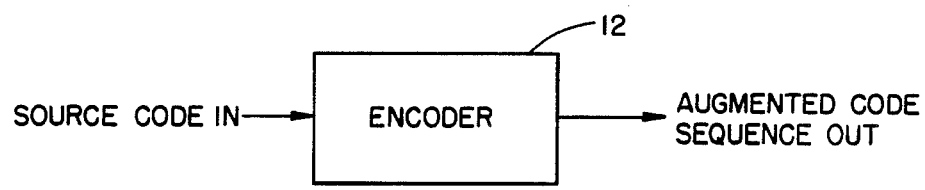
FIG. 3a is a block diagram of a data channel encoder according to to the present invention.
Figure 3B:
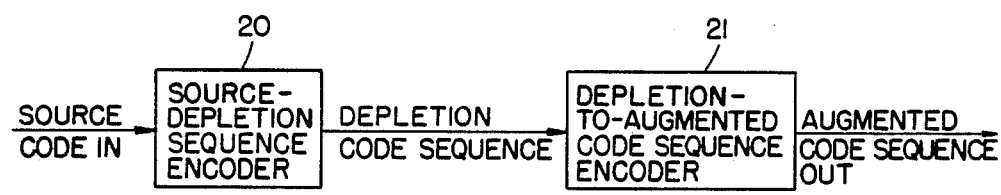
FIG. 3b is a block diagram as for FIG. 3a with the encoder shown in two parts, there being an intermediate stage where the code sequence is represented in a depletion code form.

FIGS. 3a, 3b expand upon the encoder 12 illustrated in FIGS. 1 and 2. As indicated in FIG. 3a, the encoder 12 can be a simple lookup table or data array which is addressable via the given characters of the given source code. Upon receiving the address, the table or array provides the corresponding augmented code sequence out. Encoder 12 may also be a hardware implementation, a firm ware implementation, or a software implementation of the algorithm for generating the variable length code from a given source code.

FIG. 3b illustrates a source code to augmented code sequence encoder that utilizes the intermediate depletion code representation which may be useful in data handling or storage. The incoming source code is converted to the depleted block codes by the source-depletion sequence encoder 20 to generate a depletion code sequence. The depletion to augmented code sequence encoder 21 may be either a lookup table or a hardware, firm ware, or software implementation of the algorithm for generating the augmented variable code from the depletion code as hereinbefore previously described.

Figure 4A:
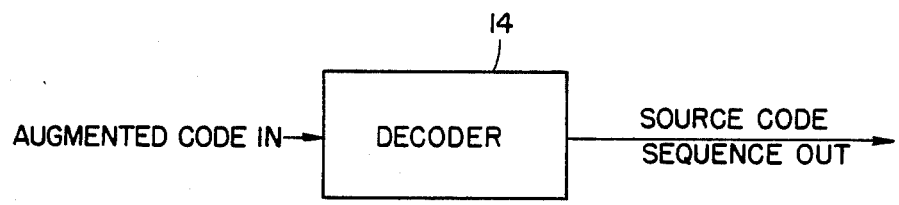
FIG. 4a is a block diagram of a data channel decoder according to the present invention.
Figure 4B:
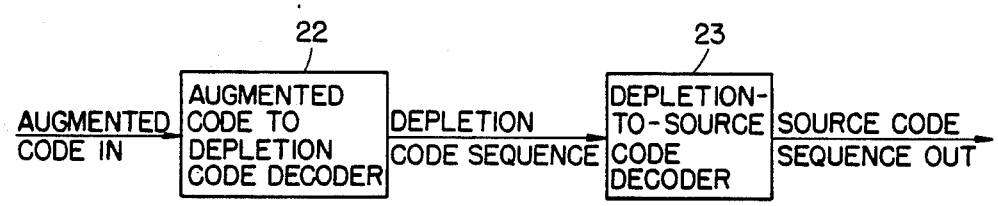
FIG. 4b is a block diagram as for FIG. 4a with the decoder shown in two parts, there being an intermediate stage where the code sequence is represented in a depletion code form.

Likewise, FIG. 4b illustrates the decoder 14 of FIGS. 1 and 2 which receives the augmented code and provides a source code sequence. The decoder 14 is a lookup table or data array that is addressable by the variable length augmented code to provide a source code sequence out. Alternately, as hereinafter described, the decoder may include a synchronizing means for reestablishing synchronization.

FIG. 4b represents an augmented-code to source-code decoderusing an intermediate depletion-code representation wherein the augmented code is converted to depletion code by either a lookup table or hardware, firm ware, or software implementing an algorithm for converting the augmented code to a given depletion code. The depletion code is then furnished to the depletion to source code decoder 24 which is conventionally a lookup table or data array.

FIG. 5 illustrates an augmented code to source code decoder with code synchronization. In addition, an optional error, detection and correction system for reestablishing synchronization after error detection is also disclosed. The optional error detection and correction system operates independently of the self synchronizing nature of the augmented codes. Many computer manufacturers provide specific characters, phase encoding, or parity detection systems to indicate transmission errors. The present invention operates independently of these optional error coding detection and correction systems. FIG. 5a illustrates the manner in which the error detection system is incorporated into the decoding system. As indicated previously, the decoder 14 receives an augmented code sequence in and provides a source code sequence out. Attached to decoder 14 is a code synchronization monitor and decoder controller 25. There are actually two devices indicated at 25. The first device is a code synchronization means which provides initial synchronization or resynchronization in the event of an error or break in communication. As indicated previously, the code synchronization monitor lists each of the non-prefix characters used in generating the augmented code in a sequential lookup table with separate levels for each level of augmented code $C^0 \ldots$ to $C^q$ used in creating the augmented code. The monitor then examines each bit received in the order of occurance until a non-prefix bit from the first level of augmentation is received. The monitor then advances through the lookup table to the highest level at which the non-prefixing character is found in the lookup table. The match search is then expanded from a single bit to the number of bits present in the highest level where the non-prefixing character is found. Each character at that level is then examined for a match, and this process is repeated until the $C^q$ level is reached. At that point, any match with the incoming data string against the character in the $C^q$ level establishes synchronization, and each subsequent character received will be synchronized. Upon establishing the match at the $C^q$ level, the decoder controller reestablishes synchronization of decoder 14. It should be noted that decoder 14 may request assistance from the code synchronization monitor, or the code synchronization monitor may be triggered by the optional error detection and correction system 24.

FIG. 5b is an illustration of an augmented code to source code decoder with an intermediate depletion code representation. The intermediate depletion to source code decoder provides the ability to use the source code for data storage in the event it is desired to capture an incoming file, or for subsequent CPU processing in the event the central processor is using the depletion code characters rather than other conventional codes such as the ASCII code or EBCDIC code. It should be noted that the depleted block codes may be used as general purpose characters in the computer rather than the ASCII or EBCDIC characters. In some environments, it may be desirable to send the depleted block codes along a parallel bus path such as indicated at 26 when the computer is used in a particularly noisy environment. The depletion to source code decoder 23 provides a conversion between the depletion code and the source code when it is necessary to convert to a more conventional source code device such as ASCII for a peripheral such as a printer or a CRT display. The operation of the code synchronization monitor and decoder controller 25 is as previously described with respect to FIG. 5a.

FIG. 6a and 6b disclose block diagrams for forming single and multiple levels of augmentation on a source code character set. The devices disclosed in FIGS. 6a and 6b are identical except for the multiple level of augmentations performed. The device illustrated in FIG. 6b will generate the augmented codes to be loaded in the ROM lookup table of FIG. 10. The base character set n indicated at 28 may be binary, or may be any additional initial character set $C^0$ that is desired to be augmented. The additional base character set is supplied to the input code means 29, and control logic 30 selects through the system control 31, the prefix that is to be deleted from the initial code set and added to the replicated code set. The code symbol to become a prefix is directed by the control logic 30 to the prefix buffer 32, and the remaining members of the input code set are written into the code buffer 33. The first character set $C^0$, minus the deleted character set is then transmitted out of the code buffer and through the prefixing processor 34 to the output code set 35.

The remaining portion of the augmented first level $C^0$ is then formed by control logic 30 which writes the input code set in 29 back into code buffer 33. As the original set $C^0$ passes through the prefixing processor 34 the second time, it affixes the prefix present in prefix buffer 32 to each character read into the output code set 35. At the completion of this prefixing operation, the output code set present in 35 represents the first level augmentation $C^1$. $C^1$ is then routed by control logic 30 back to the input code set via bus 36. The process is then repeated with code set $C^1$ to provide a second level of augmentation. The levels of augmentation are determined by the control logic and system control 31. Thus, the operator may select both the deleted codes and the level of augmentation to be performed to create the variable length augmented code set. In addition, the prefixes utilized in prefix buffer 32 may also be stored for each level of augmentation, and these prefixes may be utilized to create the masker prefix codes used in the depletion code sequence. As illustrated in FIG. 6b, the input code set 29 provides a means for receiving the original character set $C^0$ and subsequent character sets $C^1 \ldots$ to $C^{q-1}$ to be augmented. The control logic 30, code buffer 33, prefix buffer 32, prefixing processor 34, and the output code set 35 provide a means for writing the character sets $C^0$ to $C^{q-1}$ twice over to form a first half and a second half which duplicates the first half. A means is provided for deleting a character in the first half through either control logic 30 or system control 31. A prefixing processor 34 prefixes the deleted character to each character symbol in the second half as it passes from code buffer 33 to output code set 35. The control logic means 30 sequences the input code means, the buffer means and the prefixing processor q times to form a variable length augmented code of:

$$|C^q| = 2^q(n-1)+1$$

wherein n represents a number of symbols in the original character set and $|C^q|$ represents the number of variable length augmented code symbols formed in the output code set 35 at the completion of q augmentations.

FIG. 7 is an illustration of one means of generating fixed length depletion codes or block codes that may be used in data processing systems or for data storage.

Figure 7A:
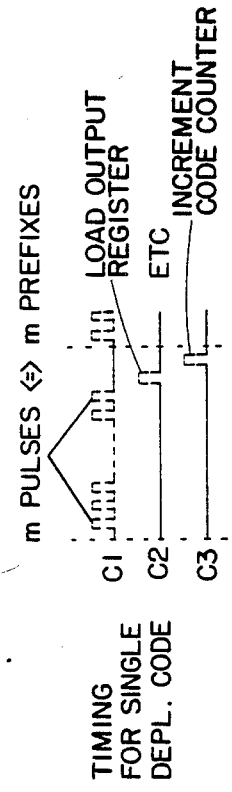
FIG. 7a is a diagramatic representation of the timing pulses on circuits C1, C2 and C3.

As illustrated in FIG. 7, the clock generator generates three signals, $C^1$, $C^2$, and $C^3$, the interrelationship of which is illustrated in FIG. 7a. Signal $C^3$ is used to count out the number of symbols $m+1$ to be used in the final depletion code wherein $2^{(m+1)}$ is equal to or greater than the desired number of characters to be used in data storage and manipulation. Clock generator 37 also generates a series of pulses for scan counter 38 for each pulse sent to the depletion code counter 39. A number of masked prefix codes are listed in the ROM device 40. Scan counter 38 is used to index the prefix codes listed in ROM 40 and provide a first signal representative of the length of the prefix code to the code masker 41. The appropriate number of pulses, and the position of those pulses as determined by code masker 41 is then furnished to comparator 42 along the signal line indicated at input a. Simultaneously, the prefix code is transmitted to comparator 42 along input line b. The comparator then compares the signal on input a and input b, and when the signals are not equal, it enables the depletion code output register 43 to load a valid depletion code from the depletion code counter 39. The entire process is repeated with each load pulse from clock generator 37 along signal line $C^2$.

Figure 8:
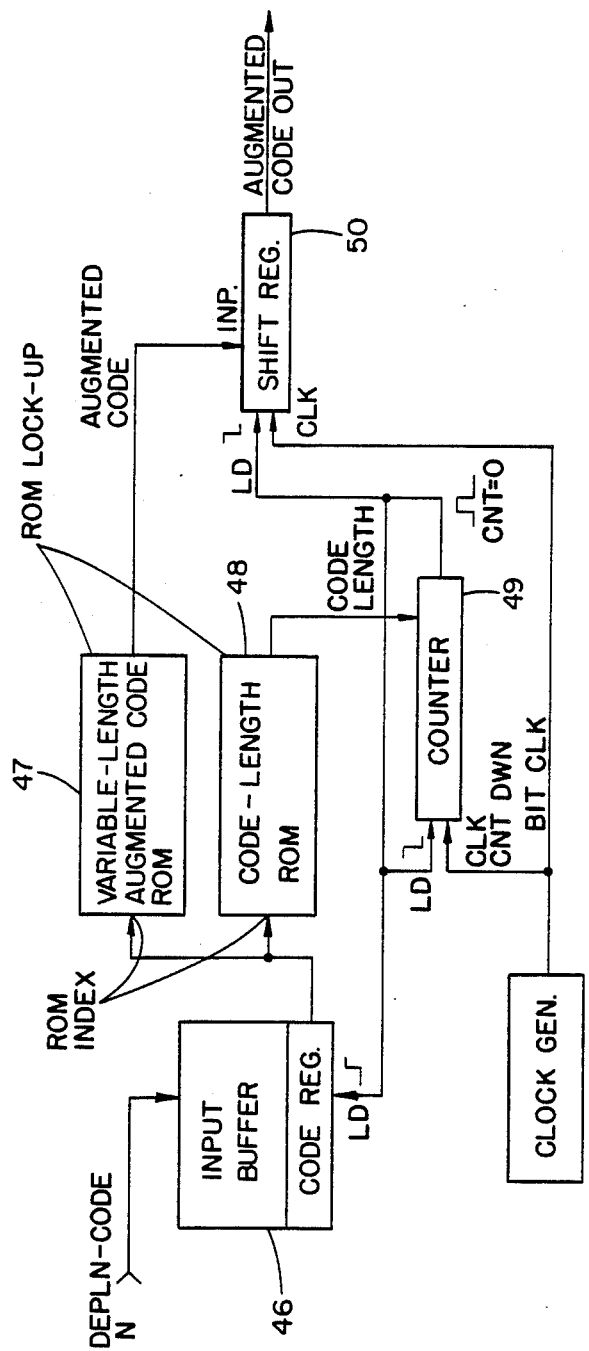
FIG. 8 is a block diagram of example encoding means using ROM.

FIG. 8 illustrates a block diagram of depletion to augmented code sequence encoder as previously described in FIG. 3b. As illustrated in FIG. 8, the depletion code is first stored in input buffer 46 which then simultaneously indexes two ROM lookup tables, 47 and 48. ROM 47 contains a variable length augmented code symbol that corresponds to each of the depleted codes. ROM 48 contains the length in digits of the variable length codes stored at the same address in ROM 47. The output of ROM 48 relating to the code length is then fed to counter 49 which sends a control pulse and a code length signal to shift register 50 to prepare the register for receiving the new augmented code from ROM table 47. As each new variable length augmented code is loaded into shift register 50, a load signal is returned to the input buffer in code register 46 to load a new depletion code for translation.

Figure 9A:
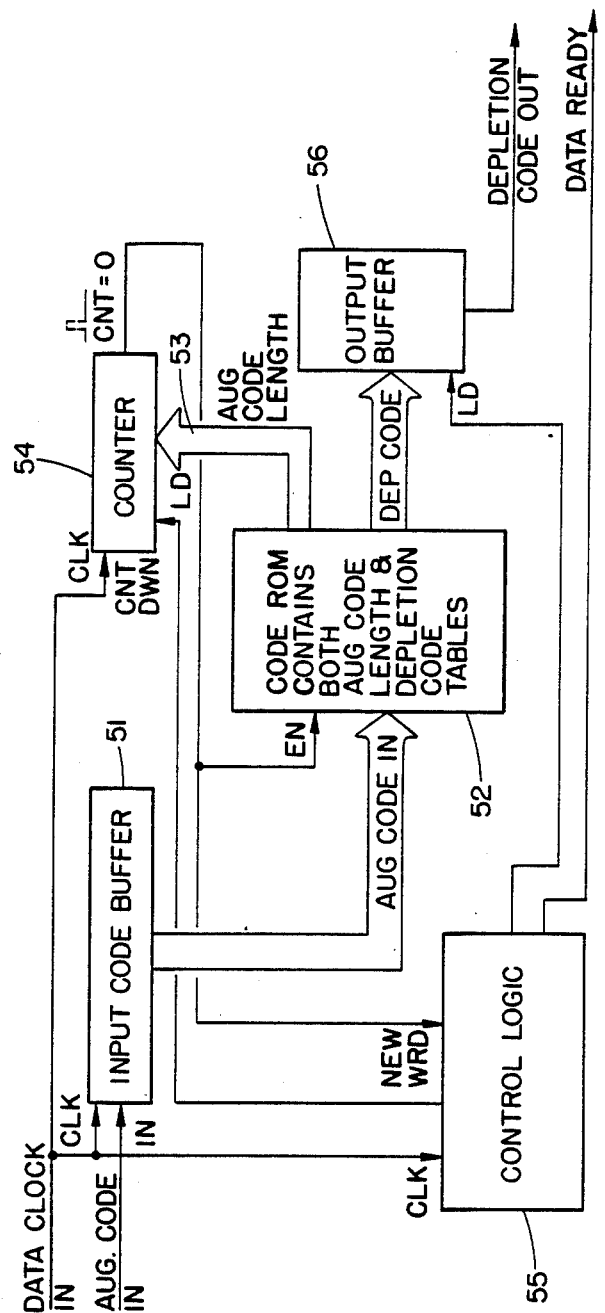
FIG. 9a is a block diagram of example decoder to translate an augmented code sequence to a depletion code sequence.

FIG. 9a is a block diagram illustrating one means that will translate the augmented code into depletion code by means of a ROM lookup table. The augmented code, being of variable length is first loaded in the input code buffer 51. Inasmuch as the length of the augmented code will vary, the elapsed time used to translate the code will vary, and some means is needed to restart the loading sequence with each new word. In addition, it is impossible for the input code buffer 51 to know when a complete word has been assembled inasmuch as the length of the word is, at this point, variable. ROM lookup table 52 contains both the augmented code by length, and its corresponding depletion code. Each of the bits is examined in order until a match is found for the augmented code, and when the match has been ascertained, the code length for that match is fed over data bus 53 to the counter 54. Counter 54 then supplies a control pulse back to control logic 55 indicating that a match has been found for the augmented code, and signalling control logic 55 for a new word to be loaded from input code buffer 51 to the ROM table 52. When the means illustrated in FIG. 9a is used in the ASCII environment, an augmented code having seven levels of augmentation, will result in 129 variable length code symbols, the longest of which is 15 bits. Thus, ROM 52 will always be reloaded to at least 15 from input code buffer 51 each time control logic 55 indicates a new word. The number of bits loaded from input code buffer 51 to ROM 52 will vary from word to word as the words are translated. When ROM 52 identifies a match, the corresponding depletion code is provided to output buffer 56, and the entire process is repeated beginning with the variable loading between input code buffer 51 and ROM table 52.

Figure 9B:
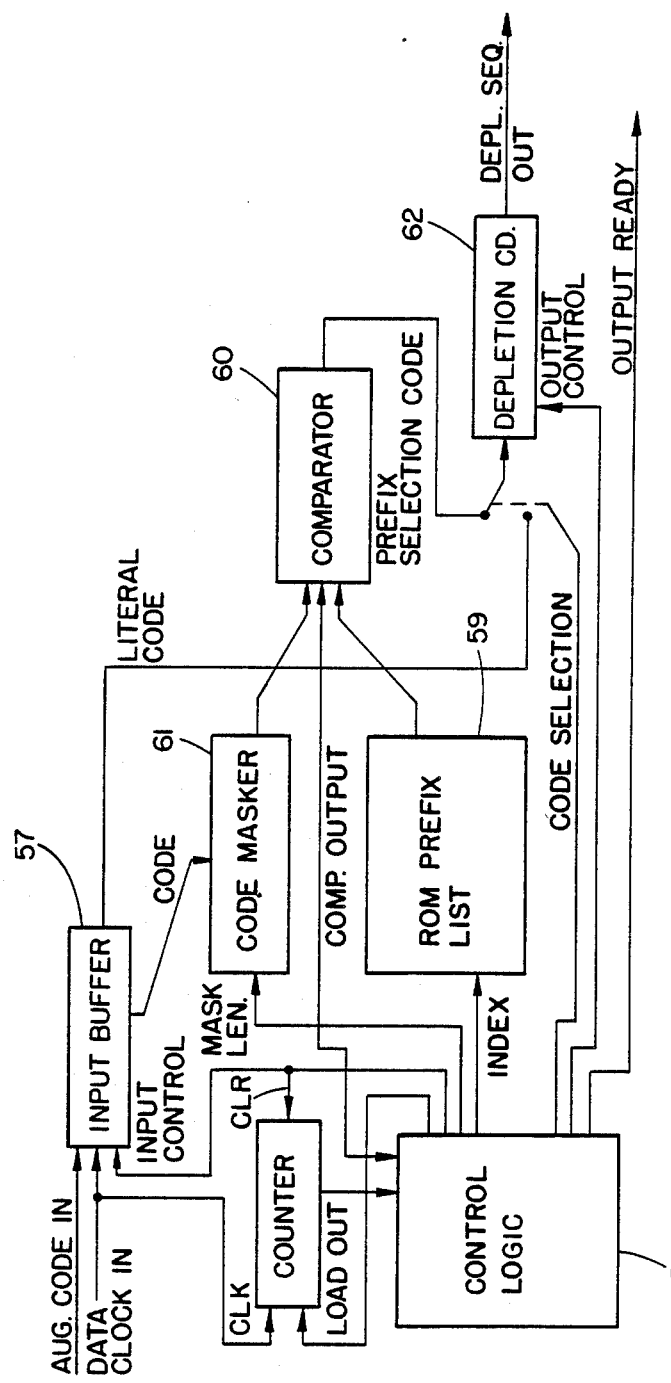
FIG. 9b is a block diagram example of a decoding system to translate an augmented code sequence to a depletion code sequence.

FIG. 9b illustrates a block diagram of a decoding process in which an input sequence of augmented codes is decoded to a sequence of depletion codes by a ROM prefix listing. As illustrated in FIG. 9a, the ROM listing must be large enough to contain $|C^q|$ characters for both the augmented code and the depletion code. When used in the ASCII environment, the ROM would then contain seven levels of augmentation and depletion and 129 characters. In contrast, the device illustrated in 9b need only store 7 prefix values in the ROM prefix list. The remainder of the conversion between the augmented code and the depletion code is generated either by hardware, by firm ware, or by software implementation on a general purpose processor. The operation of FIG. 9 will be hereinafter described with reference to the prefix listing on page 38 utilizing the following prefix code previously discussed on page 38.

As illustrated above, the prefix codes 101, 100 . . . 0 represent the prefix codes for seven levels of augmentation. The augmented variable length code is 1100101. This variable length code is received by the input buffer 57 and control logic 58 is activated. The seven prefix codes noted above are listed in the ROM prefix listing, together with the number of characters occupied by each of the prefixes and the designated position represented by each in the depleted block code. The operation is essentially the inverse of the operation previously described on page 38. After the input buffer 57 has been loaded with 1100101, the control logic 58 calls for the highest level pr the most significant bit which in the case illustrated is 101. This prefix is then supplied by the ROM prefix listing 59 to the comparator 60. Simultaneously, the prefix length is supplied along the masked length circuit to code masker 61. Simultaneously, control logic 58 writes the variable length word present in the input buffer into the code masker 61. Code masker 61 then sends the three most significant bits to the comparator 60 which compares the three most significant bits in the input buffer with the seventh level prefix from the ROM prefix listing 59. As indicated previously, the three most significant bits in the input buffer are 110, and the seventh level depletion is 101. Since comparator 60 does not find a match, it signals control logic that no match is found, and control logic 58 then disables the prefix selection, and a 0 is provided to the left most designated position of the depletion code in depletion code register 62. Control logic 58 then initiates the search for the sixth level of augmentation and ROM prefix listing 59 provides the sixth level listing of 100 to the comparator 60 and a mask length of three most significant bits to the code masker 61. Inasmuch as the three most significant bits present in the code masker are still 110, comparator 60 will find no match, and will signal control logic 58 which will in turn disable the prefix selection code and cause a second zero to be entered into the second most significant bit position, at depletion code register 62. Each prefix is associated or designated to a specific bit location in the depleted block code, both the highest level prefix designated to the most significant bit. Control logic 58 then calls for the fifth level depletion prefix code which can be seen from the foregoing table is 11. ROM prefix listing 59 will forward 11 to comparator 60, and signal code masker 61 that only the two most significant digits are to be examined. Code masker 61 will then select the two most significant digits from the augmented input signal which are 11, and comparator 60 will find a match. The match is then communicated to control logic 58 over the comparator output, and control logic 58 will then load a 1 into the depletion code 62 indicating that a prefix exists for that position. Control logic 58 will then index the code masker 61 two positions and will send the fourth level prefix 01 to the comparator 60. Code masker 61 will then examine the third and fourth positions from the left and input buffer 57 will provide 00 to comparator 60. Comparator 60 will again indicate that no match is found and control logic 58 will signal a 0 to be loaded in the designated position of the depletion code. Control logic 58 will then select the third level prefix code 00 which will be furnished to comparator 60 and code masker 61 will again furnish 00 to comparator 60. Comparator 60 will then signal a match to control logic 58 which will again load a 1 in the designated position of depletion code resister indicating that a prefix code exists for this position in the depletion code. Control logic 58 again loads the prefix code for the second level depletion which is a single 1, and indexes the code masker 61 to examine the fifth digit from the left, inasmuch as matches have been found for 11 and 00. ROM prefix listing 59 provides a 1 to comparator 60 and code masker will also find a 1 for the fifth position of the augmented code. Comparator 60 will signal a match to control logic 58 which will provide a significant bit or 1 to the depletion code 62 indicating a prefix exists for the sixth position of the augmented code, as read from the left. Finally, the control logic 58 will signal the ROM prefix list to send the first level prefix code 0 to comparator 60, and will index the code masker to the sixth position of the augmented code. Inasmuch as this position is also a 0 comparator 60 will again find the match and will signal control logic 58 which will place a 1 in the seventh position of the depletion code indicating the prefix exists for this position. Finally, control logic 58 will transmit the literal code for the least significant bit to the least most significant bit portion of depletion code 62 and will simultaneously signal that the output of the depletion code is ready to send. As the depletion code 62 is set, a new augmented code may be loaded in input buffer 57.

Figure 10:
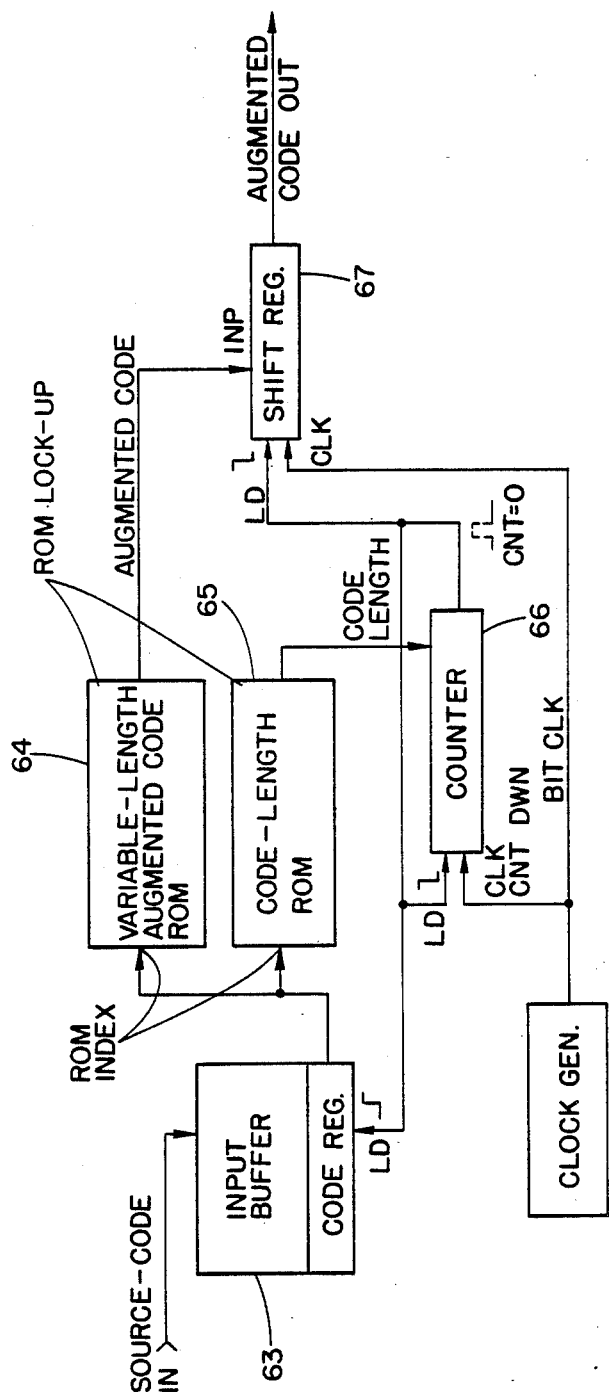
FIG. 10 is a block diagram of example encoder using ROM.

FIG. 10 illustrates a block diagram of an encoder using read only memory to translate source code into augmented code. The operation of this circuit is essentially the same as the operation of the circuit described in FIG. 8. The source code is first loaded in input buffer 63 which simultaneously accesses two ROM lookup tables 64 and 65. ROM lookup table 64 contains the variable length augmented code symbol assigned to the incoming source code. The code length ROM 65 contains the length of the variable length augmented code present in ROM lookup table 64. The code length is then supplied to counter 66 which signals shift register 67 to accept an augmented code corresponding to the length of the variable length augmented code present in ROM 64. As the augmented code is transmitted from shift register 67, a new source code character is then loaded in input buffer 63.

What is claimed is:

1. A means for forming a set of self synchronizing variable length code symbols for use in sequential data handling, said means comprising:
   (a) input code means for receiving an original character set $C^0$ and subsequent character sets $C^1 \ldots$ to $C^{q-1}$ to be augmented,
   (b) a means for repeating each of the character sets $C^0 \ldots$ to $C^{q-1}$ twice to form a plurality of character lists having a first half and a second half which duplicates the first half,
   (c) a buffer means for buffering each selected input code in turn,
   (d) prefixing processor means for deleting a character in said first half and for prefixing said deleted character to each character symbol in said second half,
   (e) control logic means for sequencing said input code means, said buffer means for said prefixing processor q times to form a variable length augmented code of $|C^q| = 2^q(n-1)+1$ wherein n represents the number of symbols in the original character set, and $|C^q|$ represents the number of variable length augmented code symbols.

2. A means for forming a set of self synchronizing variable length code symbols as claimed in claim 1, wherein said input means, said buffer means and said prefixing processor means are digital devices and said character set $C^0$ is binary.

3. A means for forming a set of self synchronizing variable length code symbols as claimed in claim 2, wherein said means further includes a storage means for storing at least 129 variable length symbols, 128 of which are addressable as code symbols for the ASCII code.

4. A means for forming a set of self synchronizing variable length code symbols as claimed in claim 3, wherein said storage means is a lookup table.

5. A means for forming a set of self synchronizing variable length code symbols as claimed in claim 3, wherein said storage means is a data array.

6. A digital coding means for creating variable length code symbols for use in data communications handling, said means comprising:
   (a) a data buffer means for receiving a source code having a plurality of characters to be encoded,
   (b) a data storage means for storing a plurality of self synchronizing variable length augmented binary code symbols, $C^q$, wherein $|C^q|$ is equal to or greater than the number of characters N present in said source code, said binary code having been augmented q times until $$|C^q| = 2^q + 1 \geq N.$$

(c) a means for selecting a predetermined variable length code from said data storage means in response to the receipt of a single source code character at said buffer,
   (d) a means for assembling and sending the augmented variable length code symbols which represent data to be transmitted as an indefinite length string of sequential binary data.

7. A digital coding means as claimed in claim 6, wherein said data storage means is a ROM lookup table.

8. A digital coding means as claimed in claim 6, wherein said data storage means is a data array.

9. A digital coding means as claimed in claim 6, wherein said source code comprises the ASCII characters.

10. A digital coding means as claimed in claim 6, wherein said source code comprises the Extended Binary-Coded Decimal Interchange Code (EBCDIC).

11. A means for forming depleted fixed length code symbols for data storage and manipulation wherein said fixed length symbols may be readily converted to self synchronization variable length symbols, said means comprising:
    (a) a means for listing a plurality of binary symbols S of (m+1) length in numerically ascending order, wherein $2^m + 1$ is equal to or greater than the number of characters to be used in said data storage and manipulation,
    (b) processor means for selectively deleting individual binary symbols from said list S,
    (c) first control means for repetitively partitioning the list S into $2^{m-k}$ groups of $2^{k+1}$ symbols, wherein k represents the number of repetitions completed beginning at 0, said first control means repeating said partitioning step m times until k equals m,
    (d) a means for designating one of the $2^{k+1}$ symbols in the first of said $2^{m-k}$ groups of symbols, as a symbol to be deleted by said processor means,
    (e) a second control means for designating corresponding symbols in odd numbered alternate groups of symbols to be deleted by said processor means, said second control means designating additional symbols to be deleted with each partition by said first control means,
    (f) a means for storing said depleted fixed length symbols wherein the length of the fixed length symbol is m+1.

12. A means for forming self synchronizing variable length code symbols from a set of predefined and depleted fixed length code symbols, said means comprising:
    (a) an input buffer means for receiving each fixed length symbol to be converted to variable length symbols wherein the length of the fixed length code is m+1,
    (b) an indexing means for transferring the least significant bit from the fixed length code to the variable length code, said indexing means then sequentially reviewing each remaining bit beyond the least significant bit in order of significance,
    (c) a comparator means for receiving each remaining bit beyond said least significant bit from said indexing means, said comparator means comparing each sequential bit to a preselected bit and signalling when a match is found,
    (d) a storage means for storing m prefix codes,
    (e) a processor means for selecting a predefined, prefix code for each match found by said comparator means, the prefix code selected being determined by the relative position of the matched bit in the fixed length symbol, said processor means then sequentially adding each selected prefix to the least significant bit, whereby a self synchronizing variable length code is assembled for each fixed length code symbol.

13. A digital coding means for creating a set of self synchronizing variable length code symbols for use in data handling, said means comprising:
    (a) a data buffer means for receiving a source code having a plurality of characters N to be encoded, (b) a data storage means for storing a plurality of self synchronizing variable length augmented code symbols $C^q$, wherein $C^q$ is equal or greater than the number of characters N present in the source code, said code symbols having been augmented q times from a base set $C^0$ having n characters, wherein $$|C^q| = 2^q(n-1) + 1 \, N$$

(c) a means for selecting a predetermined variable length code symbol from said data storage means in response to the receipt of a single source character at said data buffer, (d) a means for assembling and outputting the variable length augmented code as a string of sequential data.

14. A method of transmitting data using a digital handling means having encoding means, channel means and decoding means, said method comprising:
   (a) inputting a source code into a memory means in said encoding means, said source code including a character set having n distinct characters,
   (b) converting the source code into a variable length augmented code, wherein said conversion includes augmenting the character set within said memory means a predetermined number of times, each of said augmentation steps including:
      (i) repeating the existing character set in memory to form a new character set having a first half and a second half which duplicates the first half,
      (ii) identifying a selected character from said first half of said new character set, and
      (iii) prefixing each character of said second half with said selected character and deleting said selected character from said first half
   (c) transmitting said variable length augmented code over said channel means to said decoding means;
   (d) restoring the variable length augmented code to said source code in said decoding means.

15. The method of transmitting data according to claim 14 wherein the number of symbols within said augmented character set after q augmentations is equal to $2^q(n-1) + 1$.

* * * * *

UNITED STATES PATENT AND TRADEMARK OFFICE
CERTIFICATE OF CORRECTION

PATENT NO. : 4,670,890

DATED : June 2, 1987

INVENTOR(S) : Mark Titchener

It is certified that error appears in the above-identified patent and that said Letters Patent is hereby corrected as shown below:

Column 5, line 53: "wall" should read as --w all--

Column 9, line 4: "set $C^q$ characters" should read as --set $C^q$ and the characters--

Column 9, line 30: "$C \{D^m i\}$" should read as --$C^m \{Di^m\}$--

Column 9, line 30: "$D^m i$" should read as --$Di^m$--

Column 10, line 13, Table 1: "00100 H" should read as --00101 H--

Column 14, lines 20-21: "process codes" should read as --process using codes--

UNITED STATES PATENT AND TRADEMARK OFFICE
CERTIFICATE OF CORRECTION

PATENT NO. : 4,670,890

DATED : June 2, 1987

INVENTOR(S) : Mark Titchener

It is certified that error appears in the above-identified patent and that said Letters Patent is hereby corrected as shown below:

Column 16, line 5: 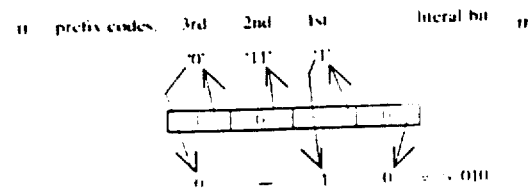

should read as -- prefix codes; 3rd 2nd 1st literal bit --
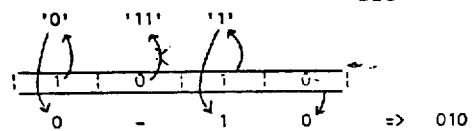
=> 010

Column 17, Table 5, line 23: under CHAR. "or" should read as --cr-- .

Column 19, line 27 under Char. "$" should read as --$--
%
&
'
*
+

%
&
'
+

UNITED STATES PATENT AND TRADEMARK OFFICE
CERTIFICATE OF CORRECTION

PATENT NO. : 4,670,890
DATED : June 2, 1987
INVENTOR(S) : Mark Titchener

It is certified that error appears in the above-identified patent and that said Letters Patent is hereby corrected as shown below:

Column 21, lines 25-35:

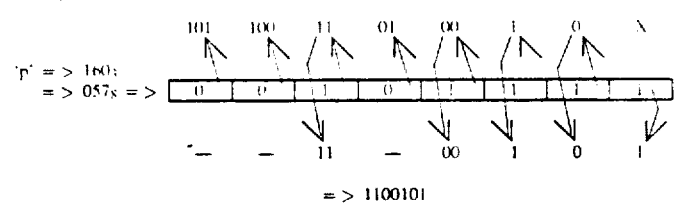  should read as

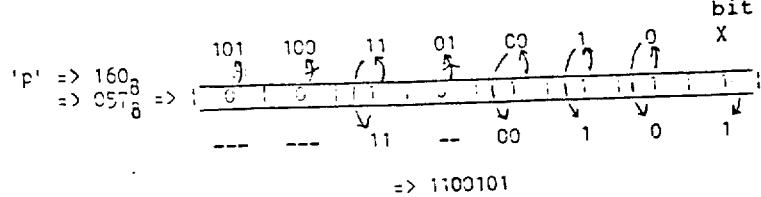

Column 21, line 66: "The bits/character" should read as --The 6.95 bits/character--

Column 23, lines 22-23: "of serial" should read as --of encoding serial--

UNITED STATES PATENT AND TRADEMARK OFFICE
CERTIFICATE OF CORRECTION

PATENT NO. : 4,670,890

DATED : June 2, 1987

INVENTOR(S) : Mark Titchener

It is certified that error appears in the above-identified patent and that said Letters Patent is hereby corrected as shown below:

Column 23, line 29: "is by comparison" should read as --is significant by comparison--

Column 23, line 35: "with absolute the" should read as --with absolute certainty the--

Column 23, line 45: "conventional band" should read as --conventional 9600 baud--

Column 25, line 41: "compared of" should read as --compared with that of--

Column 25, line 43: "complete assuming" should read as --complete set assuming--

Column 25, line 45: "garn" should read as --gain--

UNITED STATES PATENT AND TRADEMARK OFFICE
CERTIFICATE OF CORRECTION

PATENT NO. : 4,670,890
DATED : June 2, 1987
INVENTOR(S) : Mark Titchener

It is certified that error appears in the above-identified patent and that said Letters Patent is hereby corrected as shown below:

Column 31, Table 14: "k g sp a"

should read as -- k g a --

Column 35, lines 16-18: "$Sa\{c\} = Wa\{c\} - S'\{c\}$
$Sb\{c\} = Wb\{c\} - S'\{c\}$"

should read as --$Sa\{c\} = Wa\{c\} + S'\{c\}$
$Sb\{c\} = Wb\{c\} + S'\{c\}$--

Column 36, line 60: "uniqueness decoded"

should read as --uniqueness theorem this decoded--

Column 37, line 14: $D_{1+1} \neq \alpha$" should read as --$D_{1+k+1} \neq \alpha$--

UNITED STATES PATENT AND TRADEMARK OFFICE
CERTIFICATE OF CORRECTION

PATENT NO. : 4,670,890
DATED : June 2, 1987
INVENTOR(S) : Mark Titchener

It is certified that error appears in the above-identified patent and that said Letters Patent is hereby corrected as shown below:

Column 39, line 56: "FIG. 4b" should read as --FIG. 4a--

Column 43, line 2: "least 15 from" should read as --least 15 bits from--

Column 43, line 40: "pr the" should read as --prefix for the--

Signed and Sealed this

Third Day of May, 1988

*Attest:*

DONALD J. QUIGG

*Attesting Officer*   *Commissioner of Patents and Trademarks*